US009924553B2

(12) United States Patent
Lim et al.

(10) Patent No.: US 9,924,553 B2
(45) Date of Patent: Mar. 20, 2018

(54) METHOD AND APPARATUS FOR MEASURING LINK QUALITY IN WIRELESS COMMUNICATION SYSTEM SUPPORTING DEVICE-TO-DEVICE COMMUNICATION

(71) Applicants: Samsung Electronics Co., Ltd., Gyeonggi-do (KR); Research & Business Foundation Sungkyunkwan University, Gyeonggi-do (KR)

(72) Inventors: Chi-Woo Lim, Gyeonggi-do (KR); Hyung-Jin Choi, Seoul (KR); Kyung-Hoon Won, Gyeonggi-do (KR); Won-Jun Hwang, Gyeonggi-do (KR); Wi-Pil Kang, Gyeonggi-do (KR); Kyung-Kyu Kim, Gyeonggi-do (KR); Dae-Gyun Kim, Gyeonggi-do (KR); Hyun-Seok Ryu, Gyeonggi-do (KR); Seung-Hoon Park, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 87 days.

(21) Appl. No.: 14/765,128

(22) PCT Filed: Jan. 16, 2014

(86) PCT No.: PCT/KR2014/000453
§ 371 (c)(1),
(2) Date: Jul. 31, 2015

(87) PCT Pub. No.: WO2014/119861
PCT Pub. Date: Aug. 7, 2014

(65) Prior Publication Data
US 2015/0365992 A1 Dec. 17, 2015

(30) Foreign Application Priority Data
Jan. 31, 2013 (KR) .................. 10-2013-0011060

(51) Int. Cl.
*H04W 76/02* (2009.01)
*H04B 17/318* (2015.01)
(Continued)

(52) U.S. Cl.
CPC ........ *H04W 76/023* (2013.01); *H04B 17/318* (2015.01); *H04L 27/2613* (2013.01); *H04W 24/10* (2013.01); *H04W 72/10* (2013.01)

(58) Field of Classification Search
None
See application file for complete search history.

(56) References Cited

U.S. PATENT DOCUMENTS 8,041,375 B2 10/2011 Laroia et al.
8,451,709 B2 * 5/2013 Hamaguchi ............... H04L 1/06
370/208

(Continued)

FOREIGN PATENT DOCUMENTS

EP 1953985 8/2008
KR 10-2012-0009772 2/2012

OTHER PUBLICATIONS

ISR of PCT Patent Application No. PCT/KR2014/000453 dated May 16, 2014.
(Continued)

*Primary Examiner* — Steven H Nguyen
(74) *Attorney, Agent, or Firm* — McAndrews, Held & Malloy, Ltd.

(57) ABSTRACT

The present disclosure relates to a device-to-device (D2D) communication for direct communication between nodes in a wireless communication system, wherein an operation method of a terminal includes the steps of: generating sequences, which belong to an orthogonal sequence set, according to a sequence pattern corresponding to a priority of a link; and transmitting the sequences, as signals for
(Continued)

measurement of a reception electric power of a counterpart terminal, through sub-blocks within a channel, wherein one sequence is transmitted through each of the sub-blocks.

23 Claims, 19 Drawing Sheets

(51) Int. Cl.
*H04L 27/26* (2006.01)
*H04W 24/10* (2009.01)
*H04W 72/10* (2009.01)

(56) References Cited

U.S. PATENT DOCUMENTS

| | | | |
|---|---|---|---|
| 2009/0019165 A1* | 1/2009 | Li | H04L 1/0002 709/227 |
| 2009/0068956 A1 | 3/2009 | Naito et al. | |
| 2011/0013585 A1 | 1/2011 | Jitsukawa et al. | |
| 2011/0286543 A1 | 11/2011 | Nakao et al. | |
| 2012/0021689 A1 | 1/2012 | Han | |
| 2012/0099430 A1* | 4/2012 | Vos | H04W 28/02 370/235 |
| 2013/0065522 A1* | 3/2013 | Hwang | H04B 5/00 455/41.1 |
| 2013/0083684 A1* | 4/2013 | Yeh | H04W 8/26 370/252 |
| 2014/0295858 A1* | 10/2014 | Li | H04W 74/08 455/450 |

OTHER PUBLICATIONS

Wu, et al., "FlashLinQ: A Synchronous Distributed Scheduler for Peer-to-Peer Ad Hoc Networks", Forty-Eighth Annual Allerton Conference, Allerton House, UIUC, Illinois, USA, Sep. 29-Oct. 1, 2010.

David C. Chu, "Polyphase Codes with Good Periodic Correlation Properties", IEEE Transactions on Information Therory, Jul. 1972, pp. 531-532.

* cited by examiner

METHOD AND APPARATUS FOR MEASURING LINK QUALITY IN WIRELESS COMMUNICATION SYSTEM SUPPORTING DEVICE-TO-DEVICE COMMUNICATION

CROSS-REFERENCE TO RELATED APPLICATIONS

This application is a 371 of International Patent Application No. PCT/KR2014/000453, filed on Jan. 16, 2014, entitled "METHOD AND APPARATUS FOR MEASURING LINK QUALITY IN WIRELESS COMMUNICATION SYSTEM SUPPORTING DEVICE-TO-DEVICE COMMUNICATION", which claims priority to Korean Patent Application No. 10-2013-0011060, filed Jan. 31, 2013, entitled "APPARATUS AND METHOD FOR ESTIMATING LINK QUALITY IN WIRELESS COMMUNICATION SYSTEM SUPPORTING DEVICE TO DEVICE COMMUNICATION". The entire contents of which the above-identified applications are hereby incorporated by reference.

TECHNICAL FIELD

The present disclosure relates to D2D (Device-to-Device) communication corresponding to direct communication between adjacent nodes without the aid of the existing infrastructure such as a base station or an AP (Access Point) in a wireless communication system.

BACKGROUND ART

In a D2D (Device-to-Device) communication environment, each node such as a mobile phone searches for another node physically adjacent to the node by itself, configures a communication session, and then directly transmits traffic to the counterpart node. Accordingly, the D2D communication distributes traffic concentrated on an evolved NodeB (eNB), and thus is spotlighted as an element technology of a next generation mobile communication technology, which can solve a traffic overload problem. Accordingly, a standardization organization such as 3GPP (3rd Generation Partnership Project) or IEEE (Institute of Electrical and Electronic Engineers) proceeds with a D2D communication standard based on LTE-A (Long Term Evolution-Advanced) or Wi-Fi (Wireless Fidelity).

In order to perform the D2D communication, a frame structure, a signal procedure, a scheduling procedure, and the like for direct communication between terminals should be defined in detail. Particularly, it is important to exclude interference to a cellular system or interference to D2D communication by other terminals. Accordingly, a technology, which has been known as the D2D communication, includes "FlashLinQ" of Qualcomm. The FlashLinQ defines a physical layer channel structure, a scheduling procedure, and the like for the D2D communication. Further, the FlashLinQ measures channel quality between terminals to perform the D2D communication for the scheduling procedure, and defines a reference for determining whether to perform communication based on the channel quality. More specifically, in the FlashLinQ, a transmission terminal transmits a DPS (Direct Power Signal) through an inherent single tone allocated to the transmission terminal and estimates received power and a SIR (Signal to Interference Ratio) through the DSP. Further, whether to perform the communication is determined based on the received power and the SIR.

As described above, whether to perform the communication is determined based on the signal transmitted through the single tone. Thereafter, the D2D communication is performed using a whole band for the D2D communication. That is, data communication through the whole band is performed based on channel quality estimated through the signal of the single tone. However, the channel quality estimated through the signal of the single tone provides inaccurate channel quality information on the whole band depending on a channel environment. For example, in a multi-path channel environment, there may be a large difference between reception channel power of the single tone and reception channel power of the whole band due to an influence of frequency selective fading. For example, the inaccurate measurement of the reception channel power is illustrated in FIG. 1. FIG. 1 illustrates an example of a result of channel measurement using a single tone power signal. Referring to FIG. 1, a terminal A 111 receives a DPS transmitted from each of a terminal B 112, a terminal C 113, and a terminal D 114 and estimates reception channel power. At this time, the terminal B 112, the terminal C 113, and the terminal D 114 transmit the DPSs through the single tone. Accordingly, depending on a frequency of the single tone, a measurement result different from average channel power may be made. Referring to FIG. 1, in a case of the terminal B 112, channel power lower than the average channel power may be measured using a frequency having channel power lower than the average channel power. However, in a case of the terminal C 113, channel power higher than the average channel power may be measured using a frequency having channel power higher than the average channel power.

As described above, by estimating the channel quality through the single tone power signal, a result different from the channel quality of the whole band may be created. In this case, when an SIR for an actual whole band is considered by inaccurate channel quality information, communication may be abandoned due to a measurement error even though the communication is possible. Alternatively, even though it is difficult to perform the communication, a scheduling process error, which attempts the communication due to a measurement error, may be generated. When the scheduling error is generated, a problem in terms of fairness may occur and also a transmission rate loss for entire cells may be caused.

DISCLOSURE

Technical Problem

Accordingly, an embodiment of the present disclosure provides an apparatus and a method for measuring accurate link quality in a wireless communication system.

Another embodiment of the present disclosure provides an apparatus and a method for improving a scheduling error problem through frequency selective fading of a multi-path channel environment in a wireless communication system.

Another embodiment of the present disclosure provides an apparatus and a method for measuring link quality of a whole band in a wireless communication system.

Another embodiment of the present disclosure provides an apparatus and a method for transmitting a power signal through a whole band without collision between a plurality of links in a wireless communication system.

Another embodiment of the present disclosure provides an apparatus and a method for processing a signal through a link scheduling structure through which a value close to channel quality information on a whole band can be acquired in a wireless communication system.

Technical Solution

In accordance with a first aspect of the present disclosure to achieve the object, an operation method of a terminal in a wireless communication system supporting Device to Device (D2D) communication is provided. The operation method includes: generating sequences included in an orthogonal sequence set according to a sequence pattern corresponding to a link priority; and transmitting the sequences through sub-blocks within a channel, as signals for measurement of received power of a counterpart terminal such that one sequence is transmitted per sub-block.

In accordance with a second aspect of the present disclosure to achieve the object, an operation method of a terminal in a wireless communication system supporting Device to Device (D2D) communication is provided. The operation method includes: generating sequences included in an orthogonal sequence set according to a sequence pattern corresponding to a link priority; measuring channel quality of a signal of a link of the terminal for each sub-block among signals received through sub-blocks within a channel by using the sequences; determining channel quality of a whole band by using received power for each sub-block.

In accordance with a third aspect of the present disclosure to achieve the object, an apparatus of an operation of a terminal in a wireless communication system supporting Device to Device (D2D) communication is provided. The apparatus includes: a controller for generating sequences included in an orthogonal sequence set according to a sequence pattern corresponding to a link priority; and a modem for transmitting the sequences through sub-blocks within a channel, as signals for measurement of received power of a counterpart terminal such that one sequence is transmitted per sub-block.

In accordance with a fourth aspect of the present disclosure to achieve the object, an apparatus for an operation of a terminal in a wireless communication system supporting Device to Device (D2D) communication is provided. The apparatus includes: a modem for receiving signals through sub-blocks within a channel; and a controller for generating sequences included in an orthogonal sequence set according to a sequence pattern corresponding to a link priority, measuring channel quality of a signal of a link of the terminal for each sub-block among the signals, and determining channel quality of a whole band by using received power for each sub-block.

Advantageous Effects

The present disclosure proposes a technology for independently measuring received power of each link and a link scheduling channel structure for link scheduling through which accurate channel quality can be acquired without any link interference although each terminal transmits a signal through a whole band in a wireless communication system. Accordingly, each terminal can acquire accurate channel quality information on a whole band in which actual data transmission is performed. Therefore, the problem of the prior art that channel quality of a whole band is not considered can be solved.

BEST MODE FOR CARRYING OUT THE DISCLOSURE

Hereinafter, exemplary embodiments of the present disclosure will be described in detail with reference to the accompanying drawings. Further, in the following description of the present disclosure, a detailed description of known functions and configurations incorporated herein will be omitted when it may make the subject matter of the present disclosure rather unclear.

In the present disclosure, a technology for measuring link quality of a whole band in a wireless communication system supporting D2D (Device to Device) communication, that is, direct communication between terminals is described. In the present disclosure, a wireless communication system of an OFDM (Orthogonal Frequency Division Multiplexing)/ OFDMA (Orthogonal Frequency Division Multiple Access) scheme is described as an example. In the present disclosure, a terminal performing D2D communication may be a portable electronic device, and may be one of a smart phone, a portable terminal, a mobile phone, a mobile pad, a media player, a tablet computer, a handheld computer, and a PDA (Personal Digital Assistant). Further, the terminal may be a device having a function, which is generated by combining two or more functions of the above described devices.

First, a D2D communication procedure according to an embodiment of the present disclosure is briefly described below.

Figure 1:
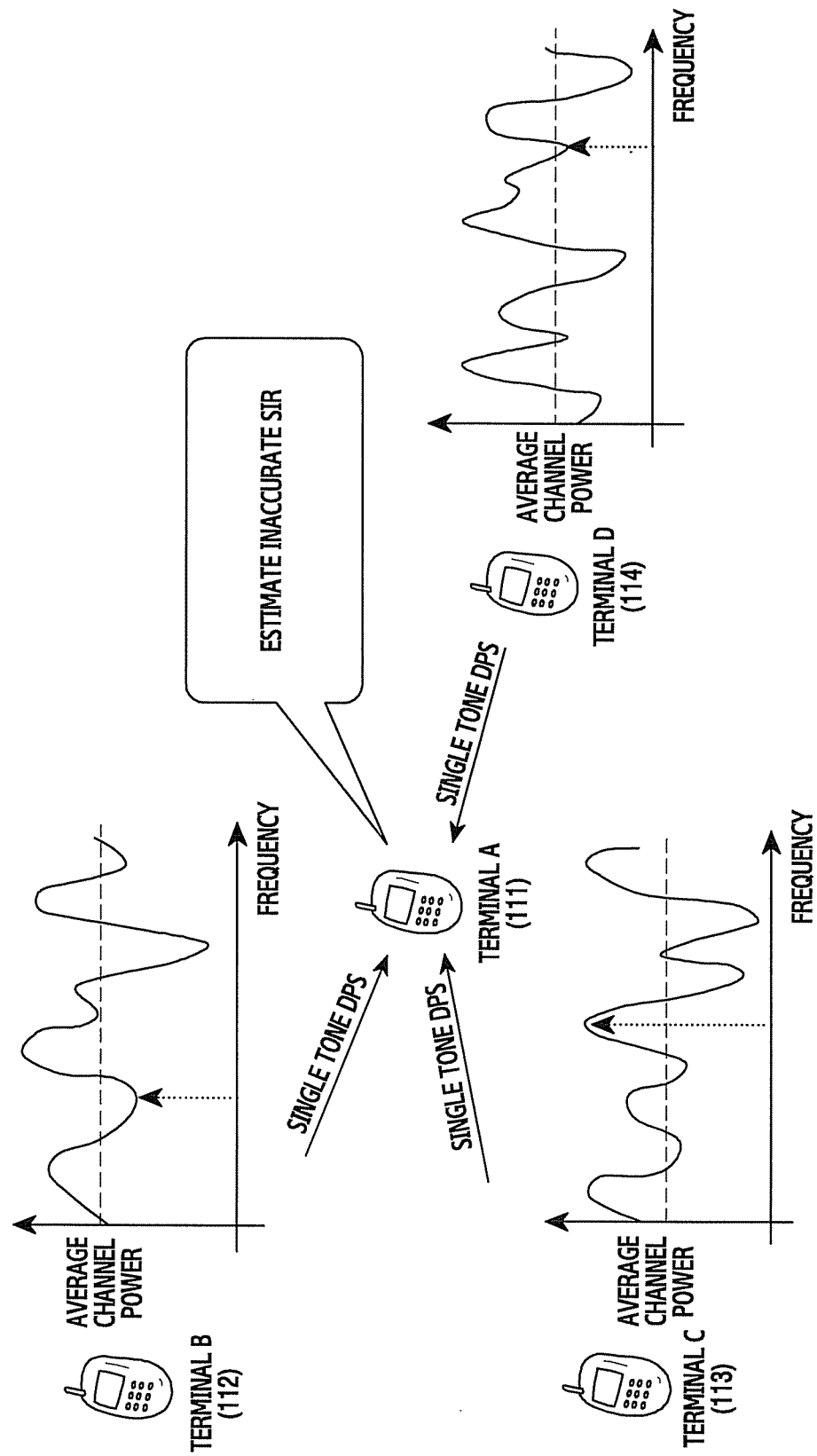
FIG. 1 illustrates an example of a result of channel measurement using a single tone power signal.
Figure 2:
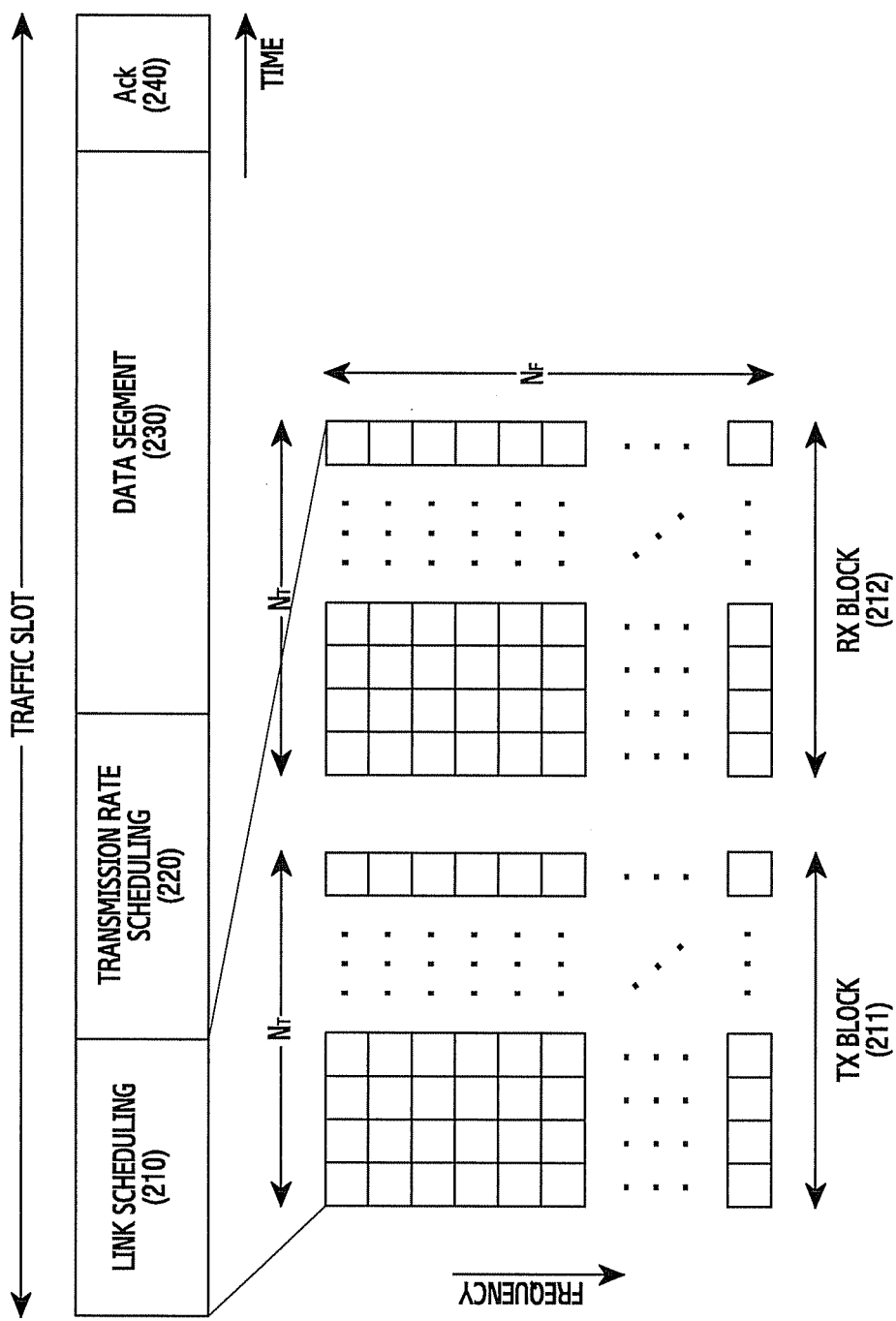
FIG. 2 illustrates a traffic slot channel structure for D2D communication in a system according to an embodiment of the present disclosure.

FIG. 2 illustrates a traffic slot channel structure for D2D communication in a system according to an embodiment of the present disclosure. Referring to FIG. 2, the traffic slot includes four channels such as a link scheduling channel 210, a rate scheduling channel 220, a data segment channel 230, and an ACK (acknowledgement) channel 240. For example, the traffic slot may be 2 ms long.

The link scheduling channel 210 includes a TX block 211 and an RX block 212. The TX block 211 and the RX block 212 include NT OFDM symbols, each of which includes NF tones. Each D2D link has a unique CID (Connection Identifier), and each CID has a predetermined priority. When terminals performing D2D communication according to an embodiment of the present disclosure operate under a control of a cellular communication system, the priority may be determined by a control node such as an eNB and may be notified of to the terminals. In this case, the eNB may determine the priority in a random manner, or assign the priority according to link importance or link use fairness. However, the priority may be determined by each terminal without involvement of the control node according to another embodiment of the present disclosure.

A transmission terminal of each link transmits a signal for link quality measurement through the TX block 211 according to the priority assigned to its own link, and a reception terminal transmits a response signal corresponding to the signal through the RX block 212. At this time, the transmission terminal and the reception terminal determine whether to perform or abandon communication according to a result of the prediction of their channel quality and channel quality of another link having a higher priority. Such a link scheduling channel structure may allocate resources to all terminals in a distributed manner.

The rate scheduling channel 220 is used for determining a modulation scheme and a coding rate suitable for a link through which data is transmitted, with respect to links scheduled through the link scheduling procedure. Through the data segment channel 230, each of transmission terminals of links scheduled by applying the modulation scheme and the coding rate determined during the transmission rate scheduling process transmits data by using a whole band. Accordingly, the reception terminals transmit an ACK signal to the transmission terminal to inform of whether data of the packet unit is successfully received.

In the D2D communication process, the link scheduling procedure allows each link to independently determine whether to perform transmission and aims to allow all scheduled links to communicate in a sufficiently large channel quality environment. The link scheduling procedure will be described below in detail.

Within the TX block 211 of the link scheduling channel 210, the transmission terminal of each link transmits a signal for channel quality measurement. Hereinafter, for the convenience of description, "a signal for measuring quality of a channel transmitted by the transmission terminal" may be referred to as "a power measurement signal" in the present disclosure. At this time, transmitted power of the power measurement signal may be configured to have the same power as transmitted power to be used by the data segment channel 230. Accordingly, the reception terminal of each link may measure received power of power measurement signals transmitted from all transmission terminals.

As a result, in the future, the reception terminal may predict received power of each link and channel quality in the data segment channel 230. However, since the link to perform actual transmission in the data segment channel 230 has not been determined yet, the reception terminal determines whether to perform communication in consideration of interference received from other links having a priority higher than that of the reception terminal. That is, when a total sum of received power from all links having priorities higher than that of the reception terminal is considered as total interference power, if reception channel quality is measured as being equal to or smaller than a threshold, the reception terminal determines that the communication is not possible due to interference and thus abandons the communication.

When the communication is not abandoned, the reception terminal transmits a signal for informing of received power of the signal of the reception terminal to the transmission terminal through the RX block 212. Hereinafter, for the convenience of description, "the signal for informing of received power of the signal of the reception terminal to the transmission terminal" is referred to as an "inverse power signal" in the present disclosure. Further, in the present disclosure, the power measurement signal and the inverse power signal may be collectively referred to as "power signals". Transmitted power of the inverse power signal is configured as a reciprocal of the power of the power measurement signal received in the TX block 211. The transmission terminal having received the inverse power signal estimates interference, which the link of the transmission terminal gives to another link having a priority higher than that of the transmission terminal. When the transmission terminal gives interference larger than or equal to a tolerance level to another link, the transmission terminal abandons the transmission.

According to the above described procedure, the communication is performed on a link, which receives interference smaller than a threshold from another link and gives interference smaller than a threshold to another link. Accordingly, a plurality of D2D links can stably operate.

A process of determining whether the transmission terminal and the reception terminal perform communication will be described through a detailed example.

Figure 3:
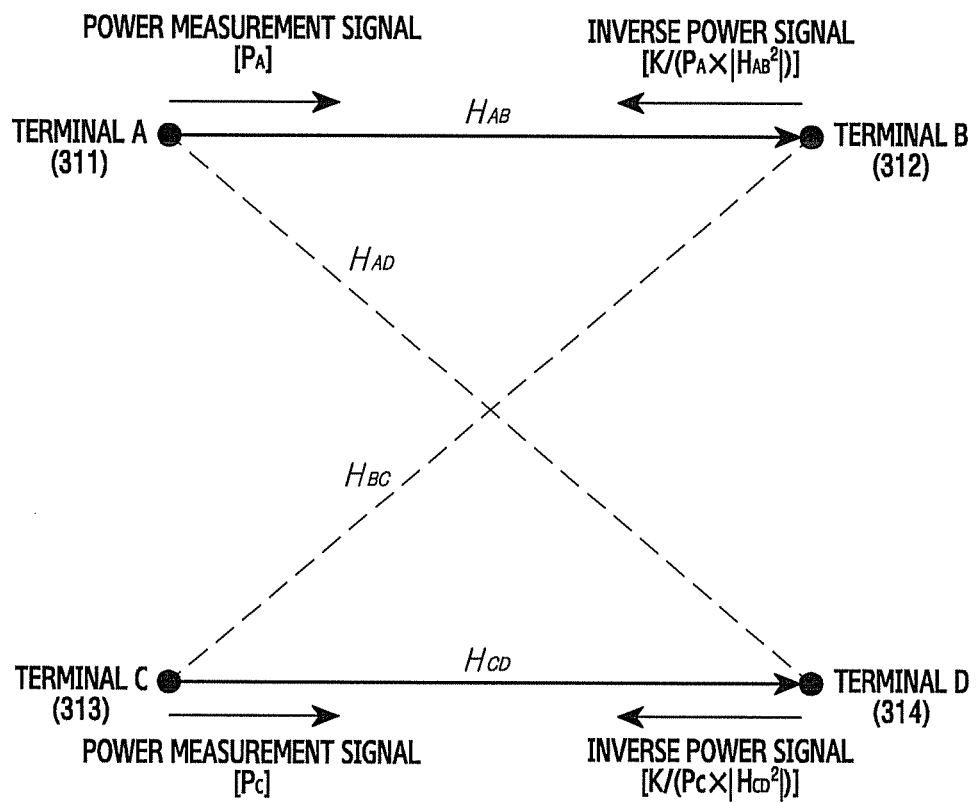
FIG. 3 illustrates an example of transmission of a power measurement signal and an inverse power signal in a wireless communication system according to an embodiment of the present disclosure.

FIG. 3 illustrates an example of transmission of a power measurement signal and an inverse power signal in a wireless communication system according to an embodiment of the present disclosure. An environment where two D2D links exist is described as an example in FIG. 3.

Referring to FIG. 3, a total of four terminals such as a terminal A 311, a terminal B 312, a terminal C 313, and a terminal D 314 exist. The terminal A 311 forms a link to communicate with the terminal B 312, and the terminal C 313 forms a link to communicate with the terminal D 314. At this time, the terminal A 311 and the terminal C 313 correspond to transmission terminals, and the terminal B 312 and the terminal D 314 correspond to reception terminals. Accordingly, channels HAB and HCD due to a direct link and channels HAD and HBC due to a cross link are formed. Each link has an inherent OD, and the terminal A 311 and the terminal C 313 transmit power measurement signals for channel quality measurement. It is assumed that the link A-B has a higher priority than that of the link C-D in the present disclosure.

The terminal A 311 and the terminal C 313 transmit power measurement signals with power PA and PC, respectively. The terminal D 314 receives the power measurement signals transmitted from the terminal A 311 and the terminal 313 through the link C-D corresponding to the direct link and the link A-D corresponding to the cross link, respectively. At this time, total power of signals received by the terminal D 314 is "PC×|HCD|2+PA×|HAD|2". The terminal D 314 measures channel quality to measure interference due to the link A-B having the higher priority. The channel quality may be an SIR (Signal to Interference Ratio).

The terminal D314 may distinguish the power measurement signal of the terminal A 311 and the power measurement signal of the terminal C 313 based on a structure of the power measurement signal described below. The structure of the power measurement signal will be described below in detail. That is, the terminal D 314 may detect PA×|HAD|2 and PC×|HCD|2, and estimate channel quality by calculating (PA×|HAD|2)/(PC×|HCD|2). The terminal D 314 compares the measured channel quality with a predefined threshold. When the channel quality is equal to or smaller than the threshold based on a result of the comparison, the terminal D 314 abandons reception. For example, a condition that the terminal D 314 does not abandon the reception is shown as equation (1).

$$\frac{P_C \times |H_{CD}|^2}{P_A \times |H_{AD}|^2} > \gamma_{SIR} \quad (1)$$

In equation (1), $P_C$ denotes transmitted power, $H_{CD}$ denotes a channel coefficient between the terminal C 313 and the terminal D 314, $P_A$ denotes transmitted power of the terminal A 311, $H_{AD}$ denotes a channel coefficient between the terminal A 311 and the terminal D 314, and $\gamma_{SIR}$ denotes a threshold of the SIR.

When equation (1) is met, the terminal D 314 determines that simultaneous communication through the link C-D and the link A-B is possible, and transmits an inverse power signal to the terminal C 313 with power of K/(PC×|HCD|2). In the power, K denotes a constant designed to be suitable for the system environment, which may vary depending on a concrete embodiment. When equation (1) is not met, the terminal D 314 abandons the reception, and transmits no response signal to the terminal C 313. Meanwhile, since there is no link having a higher priority than that of the link A-B of the terminal B 312, the terminal B 312 does not abandon the reception without the condition of equation (1), and transmits an inverse power signal with power of K/(PA×|HAB|2).

The inverse power signal transmitted by the terminal B 132 is received by the terminal C 313 with power of (K|HBC|2)/(PB×|HAB|2) via the channel HBC. Accordingly, the terminal C 313 may indirectly measure channel quality of the link A-B due to the link C-D through an operation of equation (2) below.

$$\frac{P_A \times |H_{AB}|^2}{P_C \times |H_{BC}|^2} = \frac{K}{R_C \times P_C} \quad (2)$$

In equation (2), $P_A$ denotes transmitted power of the terminal A 311, $H_{AB}$ denotes a channel coefficient between the terminal A 311 and the terminal B 312, $P_C$ denotes transmitted power of the terminal C 313, $H_{BC}$ denotes a channel coefficient between the terminal B 312 and the terminal C 313, K denotes a constant defined in the system, and $R_C$ denotes received power of the terminal C 313 with respect to the inverse signal of the terminal B 312.

The terminal C 313 determines whether to abandon transmission by comparing the measured channel quality from equation (2) with a predefined threshold. For example, a condition that the terminal C 313 does not abandon the transmission is shown as equation (3) below.

$$\frac{K}{R_C \times P_C} > \gamma_{SIR} \quad (3)$$

In equation (3), K denotes a constant defined in the system, $P_C$ denotes transmitted power of the terminal C 313, $R_C$ denotes received power of the terminal C 313 with respect to the inverse power signal of the terminal B 312, and $\gamma_{SIR}$ denotes a threshold of the SIR.

The aforementioned link scheduling is performed in consideration of only links having a higher priority than that of the link.

In the aforementioned procedure, each terminal should know the priority of its own link. The priority may be determined according to every traffic slot in order to guarantee fairness between links.

Hereinafter, structures of the power measurement signal and the inverse power signal transmitted during the link scheduling procedure will be described.

The present disclosure proposes a new link scheduling structure and process, which can approximately measuring channel quality information on a whole band of the D2D communication system. According to the present disclosure, each terminal may use relatively accurate channel quality information compared to the existing structure for the link scheduling, thereby improving fairness and transmission rate deterioration problems of the prior art.

According to an embodiment of the present disclosure, the terminal transmits a power measurement signal and an inverse power signal using a whole band to measure channel quality of the whole band, rather than transmitting a single tone signal. However, if all terminals, which participate in the scheduling, simultaneously transmit signals through the whole band, orthogonality between reception signals is not guaranteed, so that channel quality of each link cannot be individually measured. Accordingly, the terminal according to an embodiment of the present disclosure uses a CAZAC (Constant Amplitude Zero Auto-Correlation) sequence or sequences having an orthogonal characteristic such as a Walsh code in order to guarantee orthogonality for transmission on the whole band. Alternatively, a single tone signal structure as well as the CAZAC sequence and the orthogonal sequence such as the Walsh code can be equally used to guarantee the orthogonality between links.

Hereinafter, a link scheduling channel structure and a detailed operation process for the operation according to the present disclosure will be described. A method of using the orthogonal characteristic of the sequence for the link scheduling structure will be described, and a link scheduling channel structure, which can reasonably use the orthogonal characteristic, will be proposed. Further, a method of acquiring average received power for a whole band from a signal transmitted in the proposed stricture and a channel quality measurement process will be described.

According to an embodiment of the present disclosure, in order to measure channel quality of a whole band, each terminal transmits a power measurement signal and an inverse power signal by using all subcarriers rather than a single tone. At this time, the terminal uses the orthogonal sequence described above to guarantee the orthogonality between links. For example, a ZC (Zadoff-Chu) sequence, which is a kind of the CAZAC sequence, shown in equation (4) may be used.

$$Z(k) = \exp\left[-\frac{j2\pi r}{N}\left(\frac{k^2}{2}\right)\right], k = 0, 1, \ldots, N-1 \tag{4}$$

In equation (4), Z(k) denotes a kth element of the ZC sequence, N denotes a sequence length of the ZC sequence, which is an even integer, and r denotes a root index, which is relatively prime with N.

In the ZC sequence, the phrase changes according to the index k but the amplitude is the same as that shown in equation (4). An autocorrelation function R(j) of the ZC sequence is shown as equation (5) below.

$$R(j) = \sum_{k=0}^{N-1} Z(k)Z^*(k \oplus j) = \begin{cases} 0, & j \neq 0 \\ N, & j = 0 \end{cases}, \tag{5}$$

In equation (5) above, R(j) denotes an autocorrelation function, N denotes a length of the ZC sequence, z(k) denotes a kth element of the ZC sequence, and $\oplus$ denotes a cyclic offset operator.

As shown in equation (5) above, under an environment where a time/frequency selective characteristic of a radio channel is limited, the same received sequences to which different cyclic offsets are applied have a perfect orthogonal correlation characteristic therebetween.

According to the present disclosure, by expressing a priority of each link through different cyclic offsets according to a cyclic autocorrelation characteristic of the ZC sequence, reception signal power can be individually measured without inter-link interference.

Figure 4:
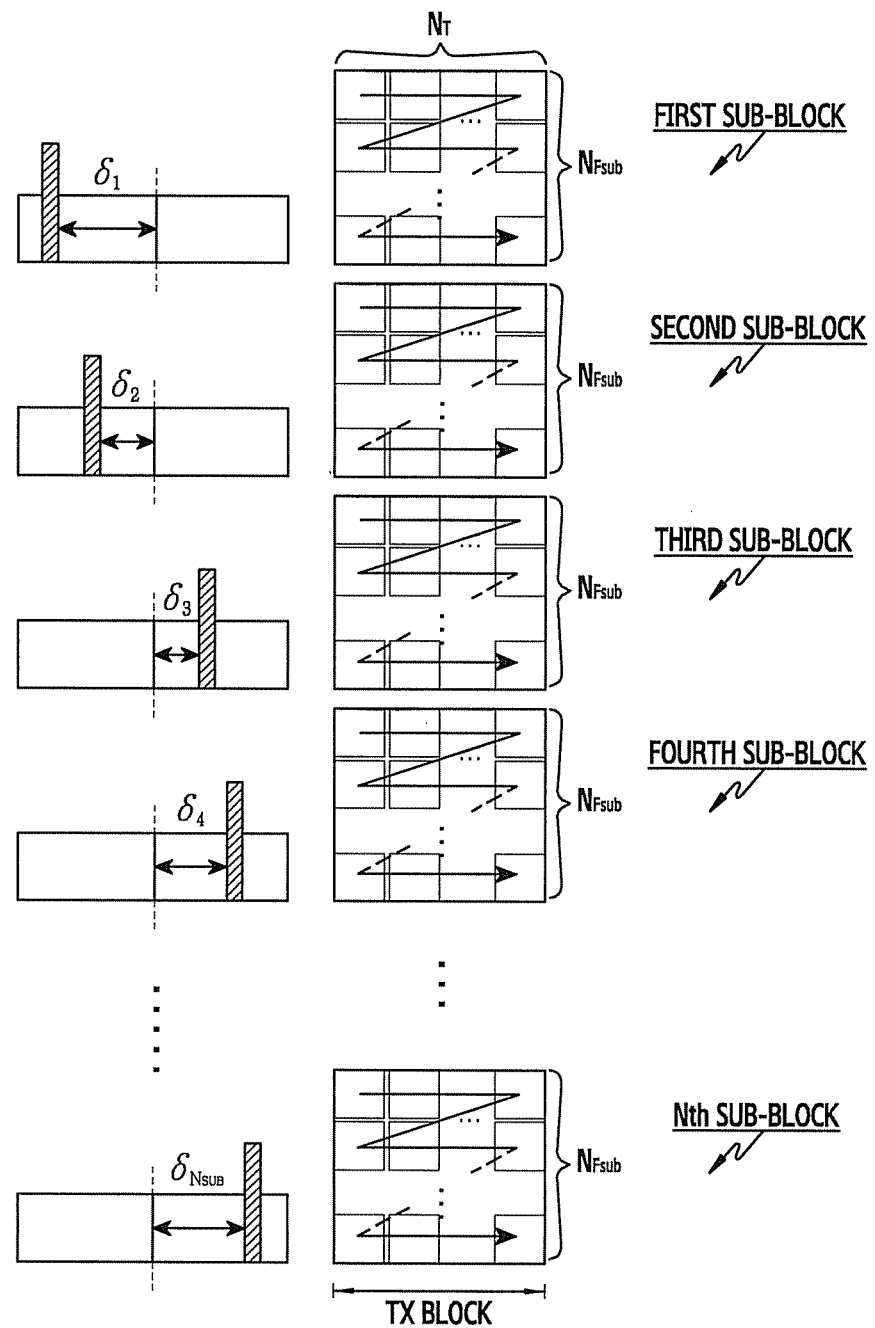
FIG. 4 illustrates a link scheduling channel structure in a wireless communication system according to an embodiment of the present disclosure.

FIG. 4 illustrates a link scheduling channel structure in a wireless communication system according to an embodiment of the present disclosure.

According to the channel structure illustrated in FIG. 4, a particular size sub-block defined to have simultaneously limited time/frequency selective characteristics of a channel is defined, a TX block or an RX block corresponding to a size of $N_T \times N_F$ is divided into sub-blocks having a size of $N_T \times N_{Fsub}$. FIG. 4 illustrates sub-blocks divided from the TX block or the RX block on a frequency axis. However, according to another embodiment of the present disclosure, the sub-blocks may be defined as a division on a time axis.

Through a plurality of sub-blocks, ZC sequences corresponding to $N_{sub}$ sub-blocks are transmitted. That is, one ZC sequence is transmitted per sub-block. However, the ZC sequence transmitted in each sub-block is applied a predetermined cyclic offset. In other words, when a power signal is transmitted, the terminal transmits a plurality of ZC sequences through a plurality of sub-blocks, and applies cyclic offsets allocated to respective sub-block to the plurality of ZC sequences. Hereinafter, in the present disclosure, a set of cyclic offsets applied to the ZC sequences transmitted by one terminal is referred to as a "cyclic offset pattern".

According to an embodiment of the present disclosure, the cyclic offset pattern is determined according to the priority of the link of the corresponding terminal. The cyclic offset pattern corresponding to the priority is predefined, and all terminals, which participate in the D2D communication, know a corresponding relation between the priority and the cyclic offset pattern. Information on the corresponding relation may be provided in the form of system information before the D2D communication is performed. Alternatively, the information on the corresponding relation may be stored in the terminal when the terminal is manufactured or a program code for the D2D communication is installed. Accordingly, the terminal identifies the cyclic offset pattern $\{\delta 1, \delta 2, \ldots, \delta N_{sub}\}$ corresponding to the priority allocated to its own link and transmits the ZC sequence to which the cyclic offset is applied to the cyclic offset pattern identified in each sub-block.

Figure 5:
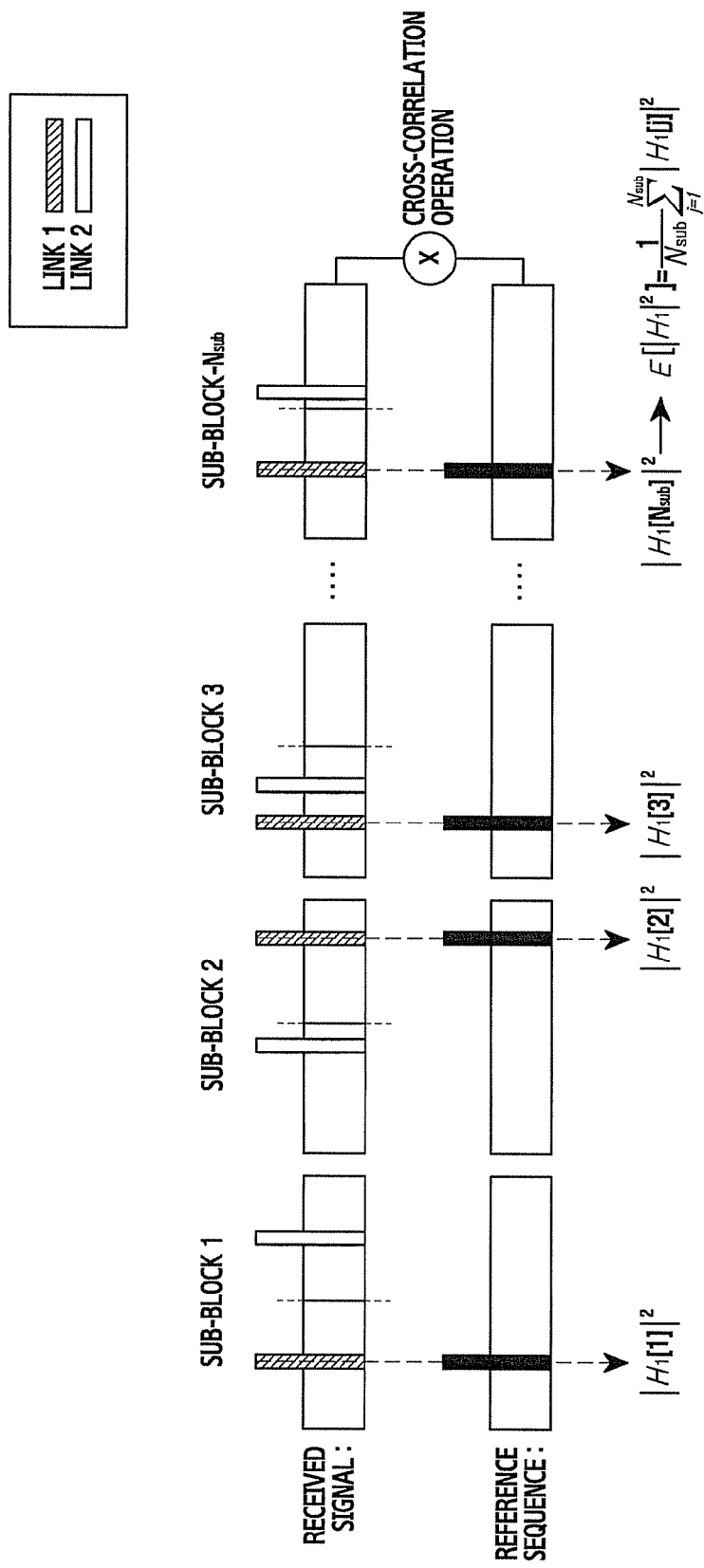
FIG. 5 illustrates measurement of received channel power in a wireless communication system according to an embodiment of the present disclosure.

FIG. 5 illustrates reception channel power measurement in a wireless communication system according to an embodiment of the present disclosure. FIG. 5 shows a case where power measurement signals for two links are received. FIG. 5 illustrates a process of measuring reception channel power in each link in the unit of sub-blocks through a cyclic cross-correlation between the received signal from the power measurement signal transmitted through the link scheduling channel in the structure as illustrated in FIG. 4 and a reference signal.

As illustrated in FIG. 5, when there is no overlap of the cyclic offset in any sub-block between links, orthogonality with a signal transmitted from another link is guaranteed. Accordingly, reception channel components can be measured without interference. Equation (6) below defines a cyclic cross-correlation function $R_i(\delta)$ between a signal $Y_i(k)$ received in an $i^{th}$ sub-block and a reference signal z(k).

$$R_i(\delta) = \frac{1}{N_T \times N_{F_{SUB}}} \sum_{k=0}^{N_T \times N_{F_{SUB}} - 1} Y_i(k) Z^*(k \oplus \delta) \tag{6}$$

In equation (6) above, $R_i(\delta)$ denotes a cyclic correlation function, NT denotes the number of time axis symbols of the TX block, $N_{Fsub}$ denotes the number of frequency axis tones of the sub-block, $Y_i(k)$ denotes a signal received in an $i^{th}$ sub-block, and $Z^*(k \oplus \delta)$ denotes a reference signal, which corresponds to a conjugate of the ZC sequence to which a cyclic shift value $\delta$ is applied.

As illustrated in FIG. 5, the terminal having received the signal acquires channel power measurement of each sub-block through the operation of equation (6) above and then calculates an average of channel power measurements of each sub-block, so as to acquire channel power of a whole band. For example, the terminal may acquire average channel power E[|H1|2] of the whole band as shown in equation (7) below.

$$E[|H_1|^2] = \frac{1}{N_{SUB}} \sum_{j=1}^{N_{SUB}} |H_1[j]|^2 \tag{7}$$

In equation (7), E[ ] denotes an average operator, $H_1$ denotes a channel coefficient of link 1, $N_{SUB}$ denotes the number of sub-blocks, and $H_1[j]$ denotes a channel estimate in a $j^{th}$ sub-block.

As described above, the power signals can be transmitted without collision over the whole band through signal sequences having orthogonality such as the ZC sequence. According to another embodiment of the present disclosure, the Walsh code may be used instead of the CAZAC sequence. In this case, Walsh codes having different indexes according to respective sub-blocks are transmitted, and an index pattern is determined according to the priority of each link.

In the ZC sequence or the orthogonal sequence such as the Walsh code, the number of all sequences maintaining the orthogonality is limited according to a sequence length. For example, since orthogonality of the ZC sequence is maintained by changing the offset, the number sequences corresponding to the sequence length may be generated. Since a plurality of links exist within limited radio resources, stochastically a plurality of links may apply the same cyclic offset within a particular sub-block. In other words, when there are a plurality of links, some cyclic offset patterns may have the same offset with respect to some sub-blocks. That is, collision may occur in some sub-blocks. An example of the collision is illustrated in FIG. 6.

Figure 6:
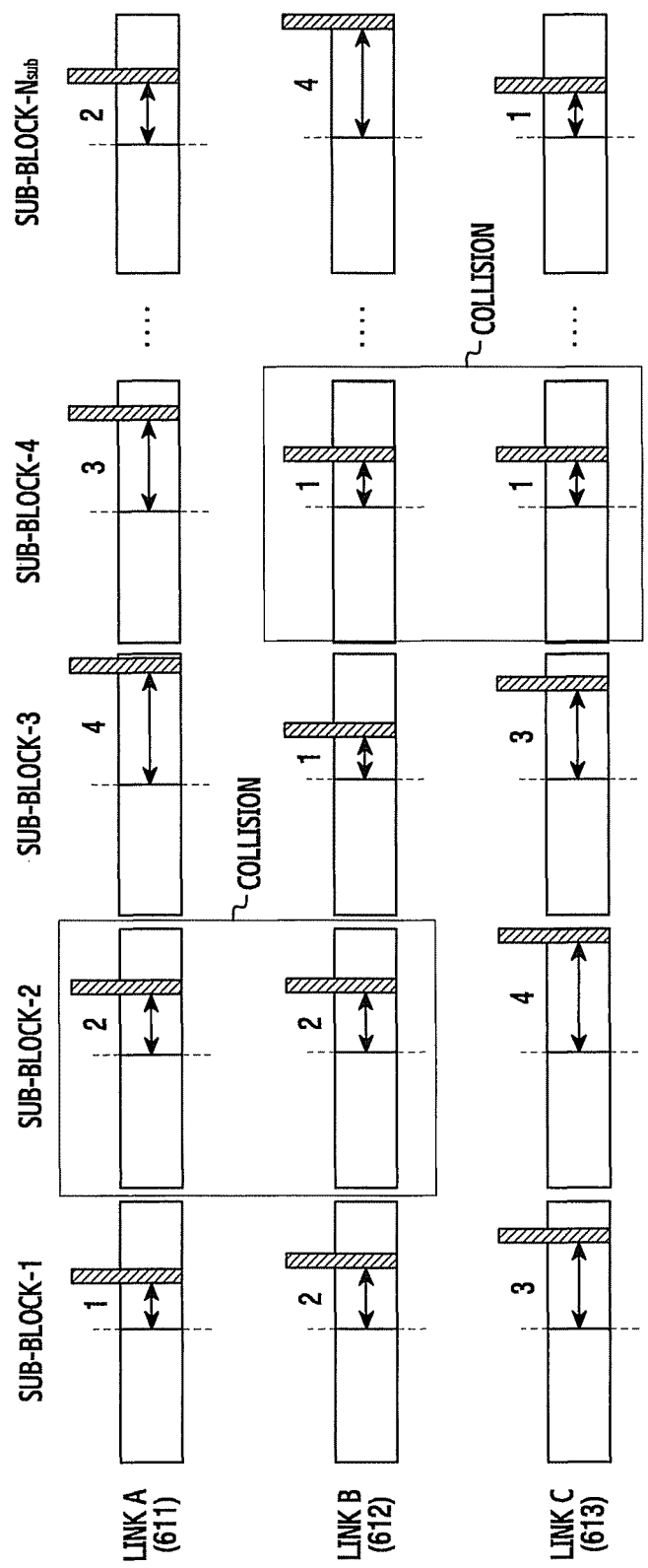
FIG. 6 illustrates collision of power signals in a wireless communication system according to an embodiment of the present disclosure.

FIG. 6 illustrates collision of power signals in a wireless communication system according to an embodiment of the present disclosure. Referring to FIG. 6, a link A 611 and a link B 612 apply the same cyclic offset in sub-block 2, and the link B 612 and a link C 613 apply the same cyclic offset in sub-block 4. In this case, due to interference, accurate channel power measurement is not possible in sub-block 2 and sub-block 4 in which collision occurs. However, since the cyclic offset application pattern of each link is predetermined according to the priority, the terminal receiving power signals may predetermine whether collision occurs in each sub-block. Accordingly, when calculating average channel power, the terminal may measure average power of a whole band by selectively using only sub-blocks, in which collision does not occur, or calculating an average of estimates in each sub-block after removing interference of estimates in sub-blocks, in which collision occurs, by applying an interference cancel scheme.

Hereinafter, for helping with understanding the present disclosure, the link scheduling procedure will be described through a concrete example.

Figure 7:
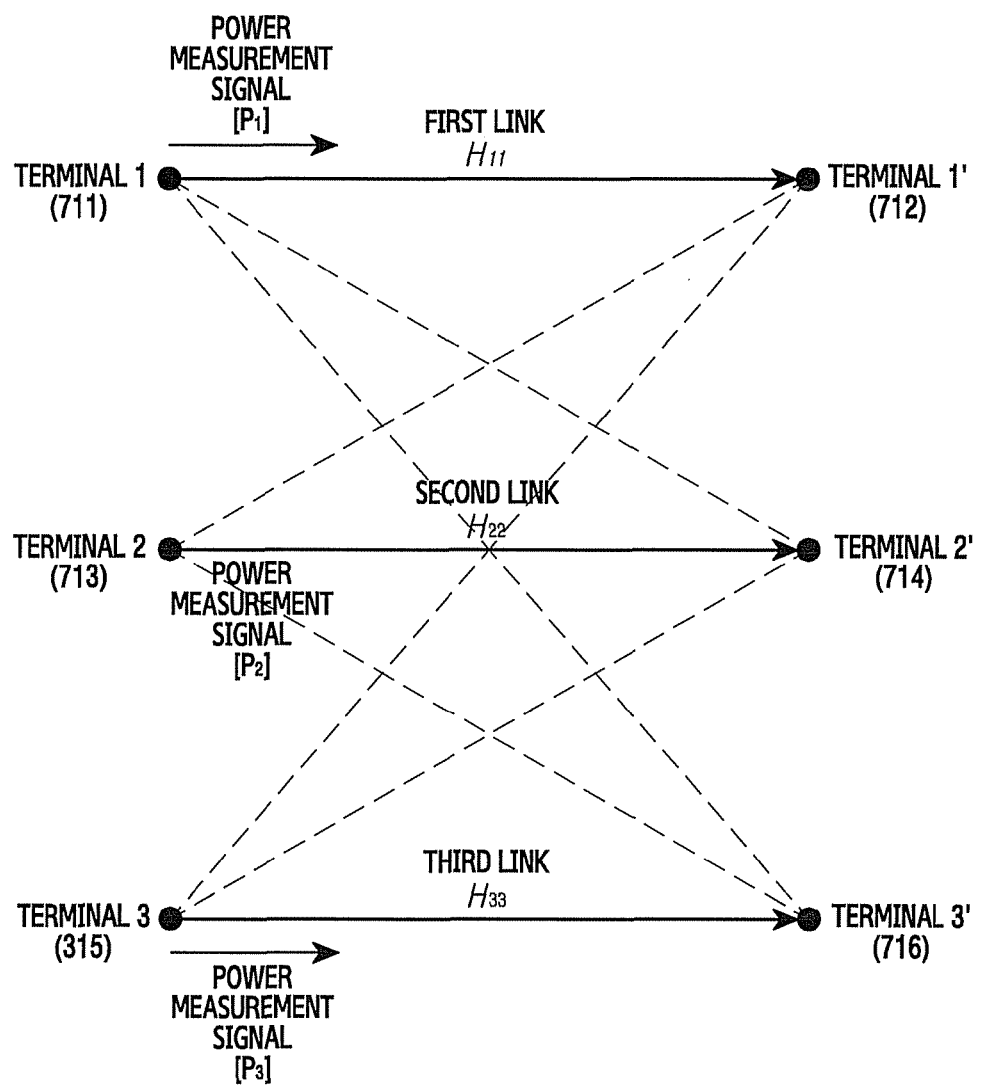
FIG. 7 illustrates links included in an interference influence range in a wireless communication system according to an embodiment of the present disclosure.

FIG. 7 illustrates links included in an interference influence range in a wireless communication system according to an embodiment of the present disclosure.

As illustrated in FIG. 7, it is assumed that three links exist within a mutual interference influence range. More specifically, a first link is formed between terminal #1 711 and terminal #1' 712, a second link is formed between terminal #2 713 and terminal #2' 714, and a third link is formed between terminal #3 715 and terminal #3' 716. In the following example, it is assumed that the number of sub-blocks $N_{SUB}$ is 6 and a sequence length $N_T \times N_{Fsub}$ is 8.

Terminal #1 711 transmits, as power measurement signals, six ZC sequences having power of $P_1$ and a length of 8 through a total of six sub-blocks. At this time, cyclic offsets {−7, −5, 3, 4, 0, 8} are applied to the ZC sequences transmitted in respective sub-blocks according to a predetermined pattern corresponding to the priority of each link. In the same way, terminal #2 713 transmits six ZC sequences of power $P_2$, to which cyclic offsets {3, 0, 4, −7, 8, 8} are applied, through the sub-blocks. Further, terminal #3 715 transmits six ZC sequences of power $P_3$, to which cyclic offsets {8, −7, 3, −7, −5, 3} are applied, through the sub-blocks. Signals $S_{1,i}(k)$, $S_{2,i}(k)$, and $S_{3,i}(k)$ transmitted from the terminal #1 711, the terminal #2 713, and terminal #3 715 through an $i^{th}$ sub-block may be shown as equation (8) below.

$$S_{1,i}(k) = \sqrt{P_1} \times Z(k \oplus \delta_{1,i})$$

$$S_{2,i}(k) = \sqrt{P_2} \times Z(k \oplus \delta_{2,i})$$

$$S_{3,i}(k) = \sqrt{P_3} \times Z(k \oplus \delta_{3,i}) \quad (8)$$

In equation (8), $S_{n,i}(k)$ denotes a signal transmitted by terminal n through an $i^{th}$ sub-block, $P_1$ denotes transmitted power of an $n^{th}$ terminal, and $Z(k \oplus \delta_{n,i})$ denotes a ZC sequence, to which an $i^{th}$ cyclic offset of the cyclic offset pattern corresponding to a priority allocated to a link of terminal n is applied.

Further, a signal $Y_{1,i}(k)$ received by terminal #1' 712, which forms the link with terminal #1 711, through the $i^{th}$ sub-block may be shown as equation (9) below.

$$Y_{1,i}(k) = H_{11,i} S_{1,i}(k) + H_{21,i} S_{2,i}(k) + H_{31,i} S_{3,i}(k) \quad (9)$$

In equation (9), $Y_{n,i}(k)$ denotes a signal received by terminal n through the $i^{th}$ sub-block, $H_{nm}$ denotes a channel coefficient between terminal n and terminal m, and $S_{n,i}(k)$ denotes a signal transmitted by terminal n through the $i^{th}$ sub-block.

Thereafter, as shown in equation (10) below, terminal #1' 712 may measure received power of a signal transmitted through an $i^{th}$ sub-block of a first link through a cyclic cross-correlation between a received signal $Y_{1,i}(k)$ and a reference signal $Z_i(k)$.

$$R_i(j) = \frac{1}{8} \sum_{k=0}^{8-1} Y_{1,i}(k) Z^*(k \oplus j) \quad (10)$$

In equation (10) above, $R_i(j)$ denotes received power in the $i^{th}$ sub-block, in which a ZC sequence to which a cyclic offset j is applied is transmitted, $Y_{n,i}(k)$ denotes a signal received by terminal n through the $i^{th}$ sub-block, and $Z^*(k \oplus j)$ denotes a reference signal, which corresponds to a conjugate of the ZC sequence to which the cyclic offset j is applied.

Figure 8A:
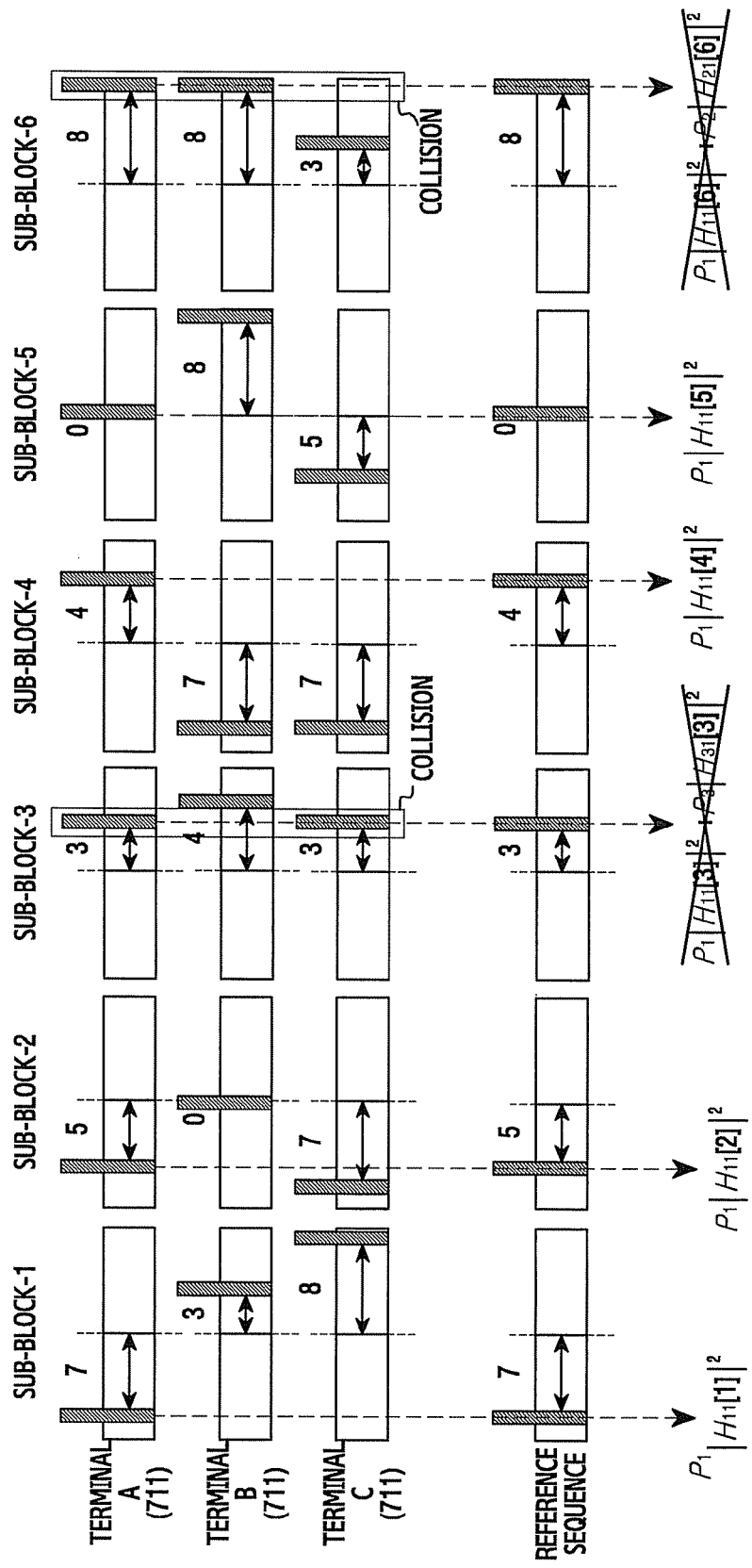
FIGS. 8A to 8C illustrate sequence collision between links included in an interference influence range in a wireless communication system according to an embodiment of the present disclosure.
Figure 8B:
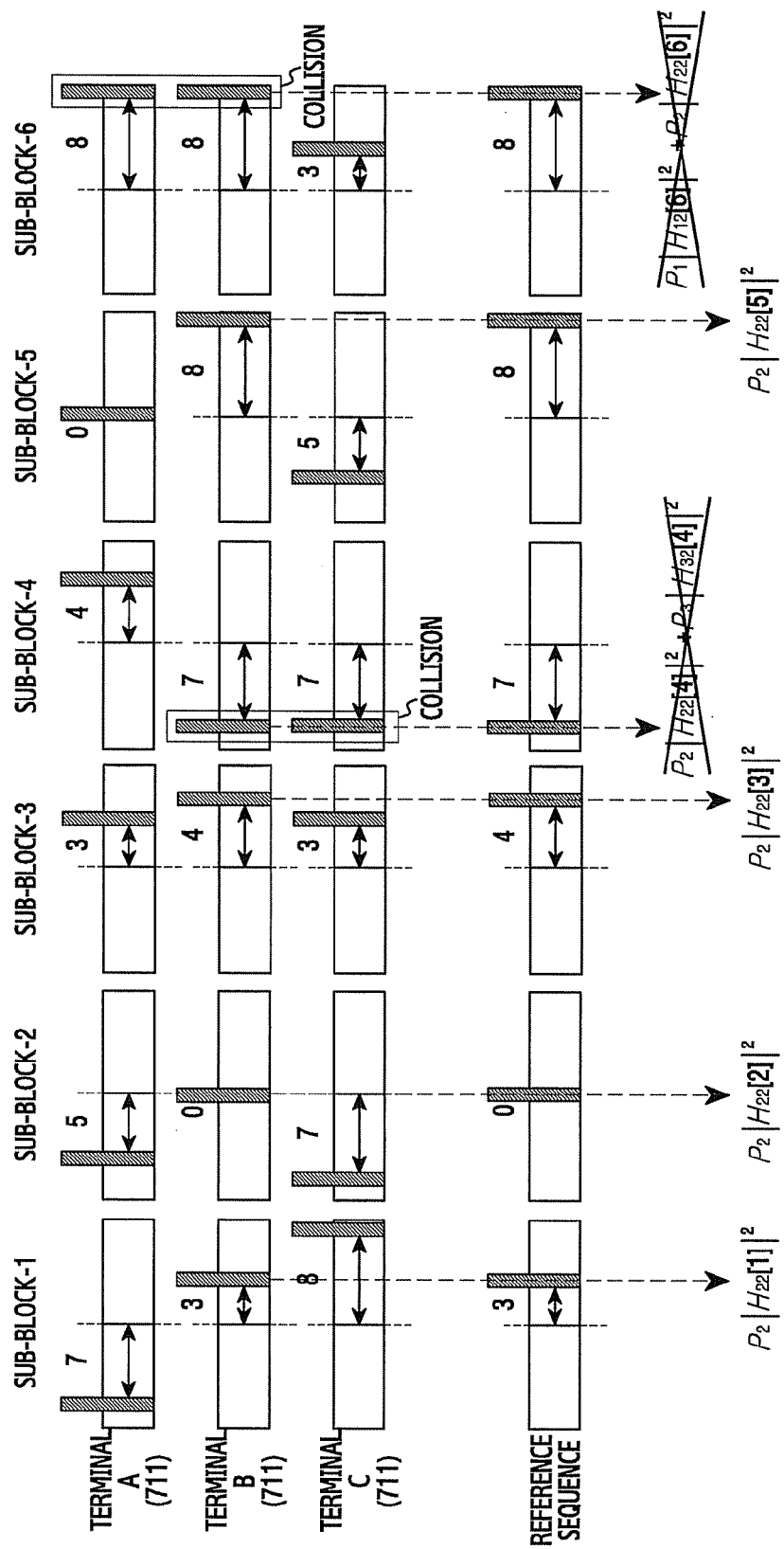
Figure 8C:
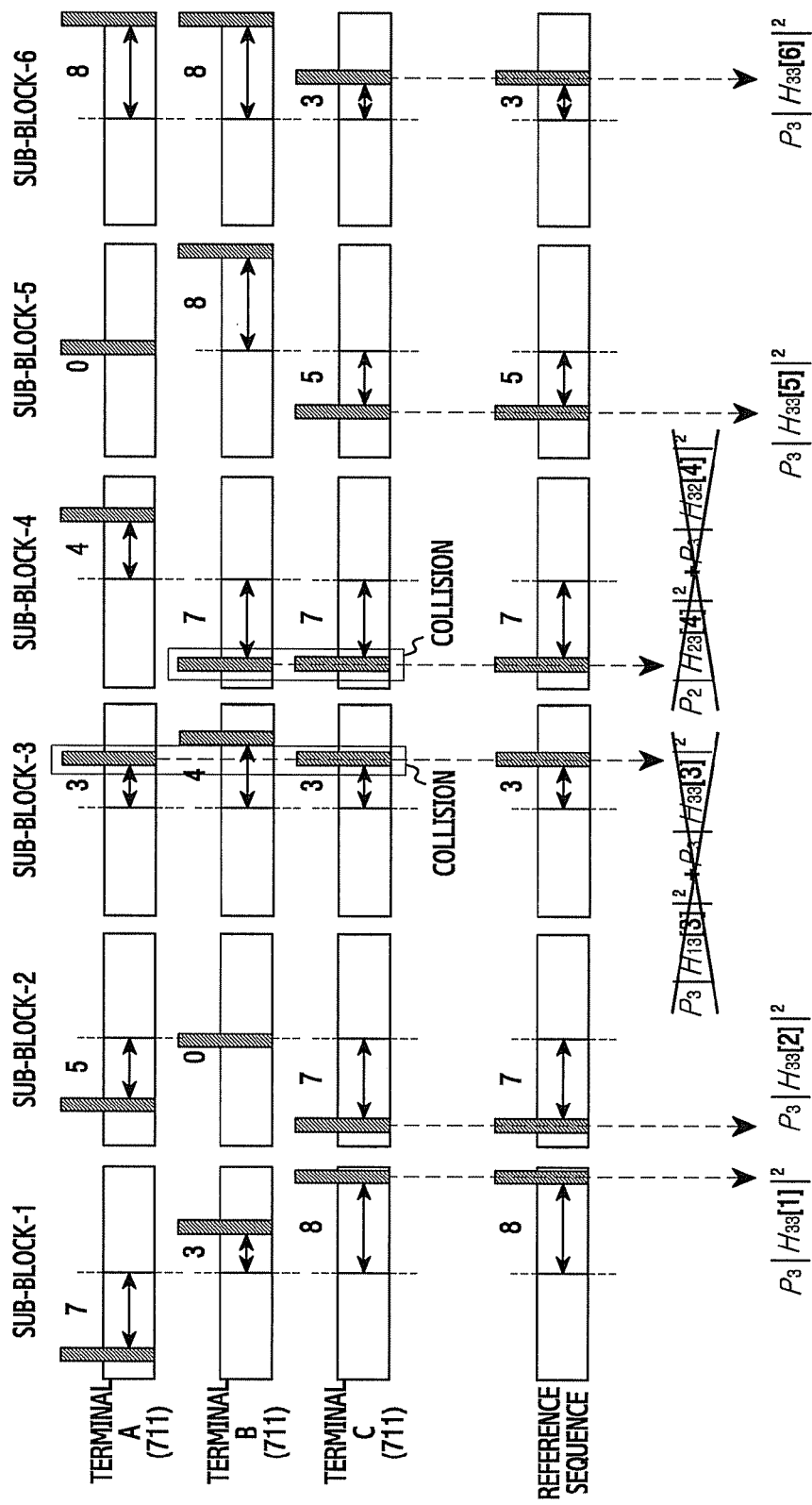

FIGS. 8A to 8C illustrate a process of measuring average received power of a first link, a second link, and a third link through the above described process. As illustrated in FIG. 8A, some of the ZC sequences transmitted by terminal #1 711 overlap terminal #2 713 in a sixth sub-block by a cyclic offset 8, and overlap terminal #3 715 in a third sub-block by a cyclic offset 3. Since an offset pattern is determined according to the priority, the existence of the overlap of the ZC sequence and an overlap position may be recognized in advance by all the reception terminals 712, 714, and 716. Accordingly, as shown in equation (11) below, terminal #1' 712 may determine average power $E[P_1|H_{11}|^2]$ of received signals on a whole band of the first link by calculating an average of received power measured in sub-blocks in which an overlap is not generated.

$$E(P_1|H_{11}|^2) \approx \frac{1}{6-2}(|R_1(-7)|^2 + |R_2(-5)|^2 + |R_4(4)|^2 + |R_5(0)|^2) \quad (11)$$

In equation (11) above, $E(P_n|H_{nm}|^2)$ denotes average power of received signals on a whole band between terminal n and terminal n', which is calculated by terminal n', and $R_i(j)$ denotes received power in the $i^{th}$ sub-block in which the ZC sequence to which the cyclic offset j is applied is transmitted.

Terminal #2' 714 and terminal #3' 716 may also determine average power of received signals on the whole band in the similar way. That is, as illustrated in FIG. 8B, terminal #2' 714 determines average power on the whole band by using the remaining received power except for received power measured in a fourth sub-block and an eighth sub-block. For example, terminal #2' 714 calculates average power E[P2|H22|2] on the whole band as shown in equation (12) below.

$$E(P_2|H_{22}|^2) \approx \frac{1}{6-2}(|R_1(3)|^2 + |R_2(0)|^2 + |R_3(4)|^2 + |R_5(8)|^2) \quad (12)$$

In equation (12) above, E(Pn|Hnm|2) denotes average power of received signals on the whole band between terminal n and terminal n', which is calculated by terminal n', and $R_i(j)$ denotes received power in the $i^{th}$ sub-block in which the ZC sequence to which the cyclic offset j is applied is transmitted.

Further, as illustrated in FIG. 8C, terminal #3' 716 determines average power on a whole band by using the remaining received power except for received power measured in a third sub-block and a fourth sub-block. For example, terminal #3' 716 calculates average power E[P3|H33|2] on the whole band as shown in equation (13) below.

$$E(P_3|H_{33}|^2) \approx \frac{1}{6-2}(|R_1(8)|^2 + |R_2(-7)|^2 + |R_5(-5)|^2 + |R_6(3)|^2) \quad (13)$$

In equation (13) above, E(Pn|Hnm|2) denotes average power of received signals on a whole band between terminal n and terminal n', which is calculated by terminal n', and $R_i(j)$ denotes received power in the $i^{th}$ sub-block in which the ZC sequence to which the cyclic offset j is applied is transmitted.

Thereafter, the terminals 711 to 716 determine interference according to the aforementioned procedure and determine whether to abandon the reception or transmission.

Hereinafter, an operation and a configuration of the terminal performing D2D communication as described above will be described with reference to the drawings.

Figure 9:
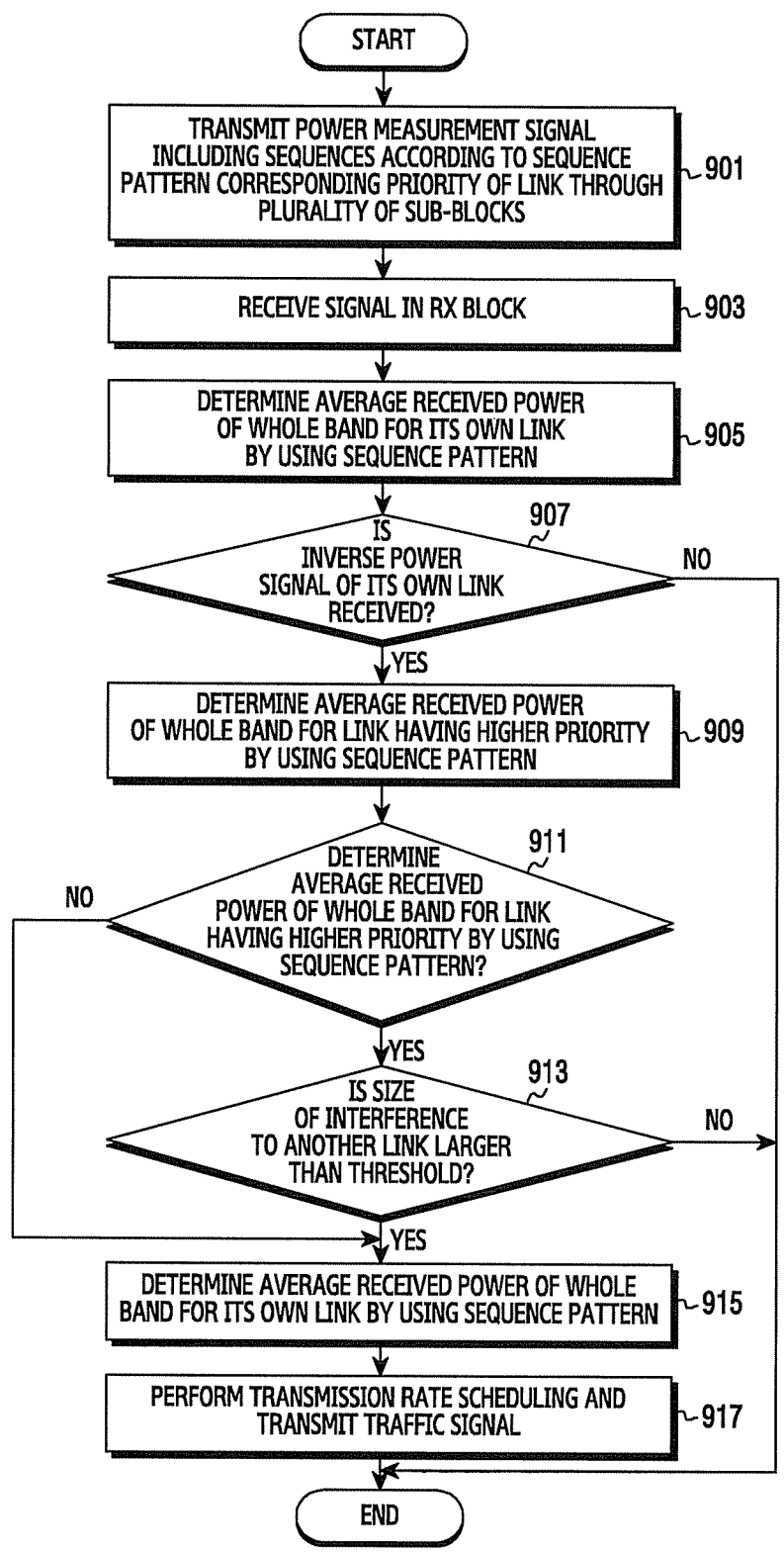
FIG. 9 is a flowchart illustrating a D2D communication performance process of a transmission terminal in a wireless communication system according to an embodiment of the present disclosure.

FIG. 9 is a flowchart illustrating a D2D communication performance process of a transmission terminal in a wireless communication system according to an embodiment of the present disclosure.

Referring to FIG. 9, the transmission terminal transmits a power measurement signal including sequences according to a sequence pattern corresponding to priorities of links through a plurality of sub-blocks within a TX block in step 901. More specifically, the transmission terminal identifies a priority allocated to its own link and identifies a sequence pattern corresponding to the priority. The sequence pattern may be a set of cyclic offsets of sequences or a set of indexes of sequences in each sub-block. Further, the transmission terminal generates sequences corresponding to the number of sub-blocks and, at this time, applies the sequence pattern. Further, the transmission terminal transmits the sequences through respective sub-blocks with a TX block of a link scheduling channel.

Thereafter, the transmission terminal receives a signal through an RX block of the link scheduling channel in step 903. At this time, the received signal may include an inverse power signal transmitted by at least one other terminal. Whether the received signal includes a signal of another terminal may be determined during a received power determination process.

Subsequently, the transmission terminal determines average received power of a whole band according to sequence patterns corresponding to the priority of its own link in step 905. That is, the transmission terminal generates a sequence pattern corresponding to the priority of its own link, that is, a reference signal according to the sequence pattern used in step 901, and measures received power of each sub-block by performing an operation of correlation between the reference signal and the received signal. Further, the transmission terminal determines average received power of a whole band by averaging received power of each sub-block. At this time, the transmission terminal determines whether the sequence pattern of its own link collides based on the number of formed links and sequence patterns of the links. When collision occurs, the transmission terminal averages received powers except for received power in one or more sub-blocks in which the collision occurs.

Thereafter, the transmission terminal determines whether an inverse power signal of its own link is received in step 907. Whether the inverse power signal is received may be determined using the average received power determination process in step 905. When the inverse power signal of its own link is not received, a result of the correlation operation may be a value approximate to 0. Accordingly, when the result of the correlation operation is larger than or equal to a particular threshold, the transmission terminal determines that the inverse power signal is received. When the inverse power signal is not received, the transmission terminal abandons transmission and ends the process.

When the inverse power signal is received, the transmission terminal determines average received power of a whole band according to at least one sequence pattern corresponding to a priority higher than that of its own link in step 909. That is, the transmission terminal generates a reference signal according to at least one sequence pattern and measures received power of each sub-block by performing an operation of correlation between the reference signal and the received signal. Further, the transmission terminal determines average received power of a whole band by averaging received power of each sub-block. At this time, the transmission terminal determines whether the sequence pattern of its own link collides based on the number of formed links and sequence patterns of the links. When collision occurs, the transmission terminal averages received powers except for received power in one or more sub-blocks in which the collision occurs. However, when there is no link having a priority higher than that of the link of the transmission terminal, steps 909, 911, and 913 may be omitted.

Thereafter, the transmission terminal determines whether an inverse power signal of a link having a higher priority is received in step 911. Whether the inverse power signal is received may be determined using the average received power determination process in step 909. When the inverse power signal of another link is not received, a result of the correlation operation may be a value approximate to 0. Accordingly, when the result of the correlation operation is larger than or equal to a particular threshold, the transmission terminal determines that the inverse power signal of the link having the higher priority is received.

When the inverse power signal is received, the transmission terminal determines whether the size of interference to another link is larger than a threshold in step 913. Another link in step 913 includes a link having a priority higher than the link of the transmission terminal. That is, the transmission terminal calculates the size of the interference to the other link by using received power of the inverse power signal of its own link and received power of the inverse power signal of the other link. For example, the size of the interference to the other link may be estimated based on equation (2) above. That is, the transmission terminal may calculate the size of the interference to the other link by multiplying the reciprocal of the product of the transmitted power of the power measurement signal and received power of the inverse power signal of the other link by a predefined constant. Further, the transmission terminal compares the interference size with the threshold. When the interference size is larger than or equal to the threshold, the transmission terminal abandons transmission and ends the process.

When the interference size is smaller than the threshold or when the inverse power signal of the link having the higher priority is not received in step 911, the transmission terminal determines an average received power of a whole band for its own link by using the sequence pattern in step 915 and performs transmission rate scheduling and transmits a traffic signal in step 917. That is, the transmission terminal determines to perform D2D communication and determines a modulation scheme and a coding rate based on channel quality of a whole band. Further, the transmission terminal generates and transmits a traffic signal according to the determined modulation scheme and coding rate.

Figure 10:
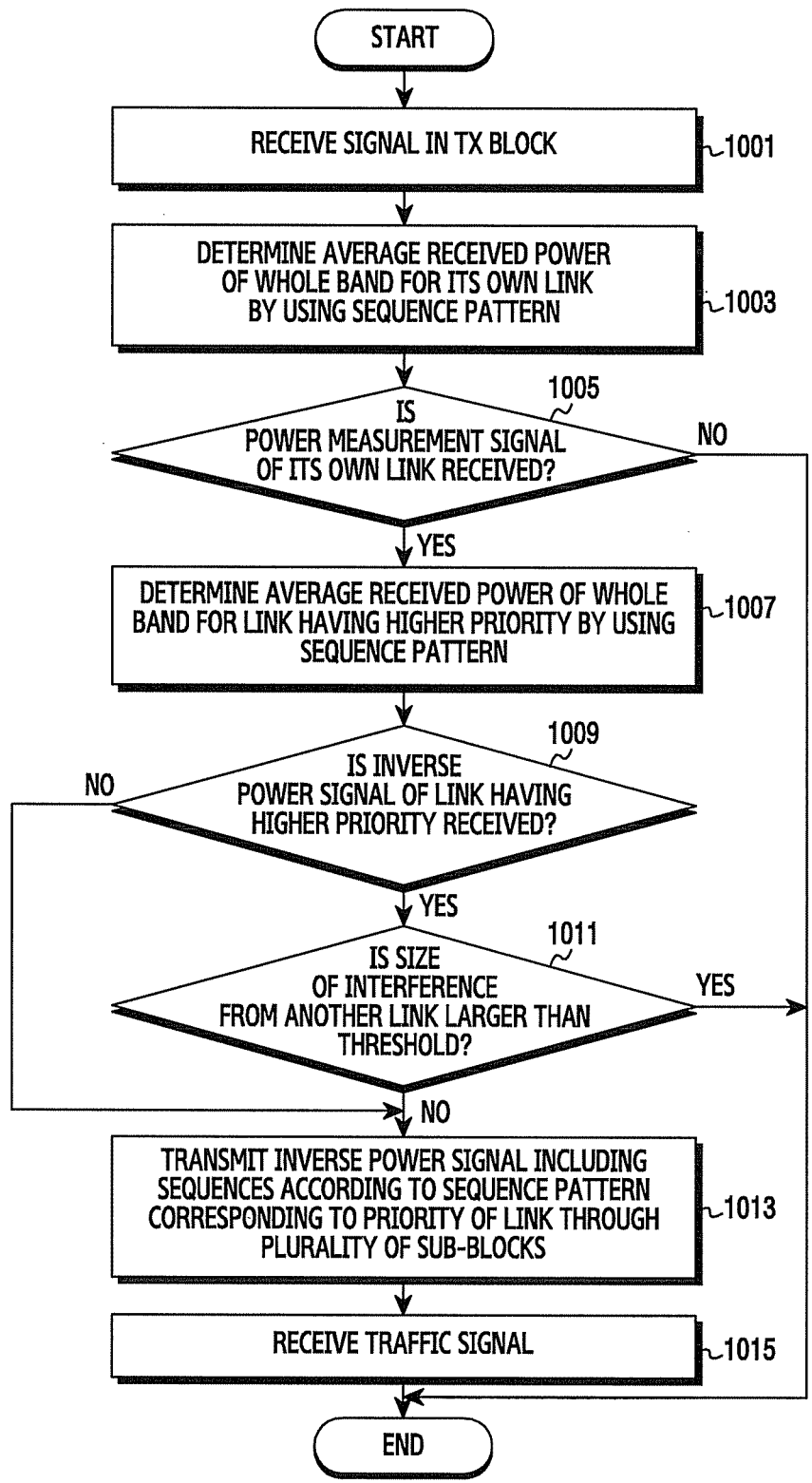
FIG. 10 is a flowchart illustrating a D2D communication performance process of a reception terminal in a wireless communication system according to an embodiment of the present disclosure.

FIG. 10 is a flowchart illustrating a D2D communication performance process of a reception terminal in a wireless communication system according to an embodiment of the present disclosure.

Referring to FIG. 10, the reception terminal receives a power measurement signal including sequences according to a sequence pattern corresponding to priorities of links through a plurality of sub-blocks within an RX block in step 1001. The power measurement signal has a sequence pattern corresponding to priorities of links between the reception terminal and the transmission terminal. The sequence pattern may be a set of cyclic offsets of sequences or a set of indexes of sequences in each sub-block. At this time, the received signal may include a power measurement signal transmitted by at least one other terminal. Whether the received signal includes a signal of another terminal may be determined during a received power determination process.

Subsequently, the reception terminal determines average received power of a whole band according to sequence patterns corresponding to the priority of its own link in step 1003. That is, the reception terminal generates a reference signal according to the sequence pattern corresponding to the priority of its own link and measures received power of each sub-block by performing an operation of correlation between the reference signal and the received signal. Further, the reception terminal determines average received power of a whole band by averaging received power of each sub-block. At this time, the reception terminal determines whether the sequence pattern of its own link collides based on the number of formed links and sequence patterns of the links. When collision occurs, the reception terminal averages received powers except for received power in one or more sub-blocks in which the collision occurs.

Thereafter, the reception terminal determines whether a power measurement signal of its own link is received in step 1005. Whether the power measurement signal is received may be determined using the average received power determination process in step 1003. When the power measurement signal of its own link is not received, a result of the correlation operation may be a value approximate to 0. Accordingly, when the result of the correlation operation is larger than or equal to a particular threshold, the reception terminal determines that the power measurement signal is received. When the power measurement signal is not received, the reception terminal abandons reception and ends the process.

When the power measurement signal is received, the reception terminal determines average received power of a whole band according to at least one sequence pattern corresponding to a priority higher than that of its own link in step 1007. That is, the reception terminal generates a reference signal according to at least one sequence pattern and measures received power of each sub-block by performing an operation of correlation between the reference signal and the received signal. Further, the reception terminal determines average received power of the whole band by averaging received power of each sub-block. At this time, the reception terminal determines whether the sequence pattern of its own link collides based on the number of formed links and sequence patterns of the links. When collision occurs, the reception terminal averages received powers except for received power in one or more sub-blocks in which the collision occurs. However, when there is no link having a priority higher than that of the link of the reception terminal, steps 1007, 1009, and 1011 may be omitted.

Thereafter, the reception terminal determines whether a power measurement signal of a link having a higher priority is received in step 1009. Whether the power measurement signal is received may be determined using the average received power determination process in step 1007. When the power measurement signal of another link is not received, a result of the correlation operation may be a value approximate to 0. Accordingly, when the result of the correlation operation is larger than or equal to a particular threshold, the reception terminal determines that the power measurement signal of the link having the higher priority is received.

When the power measurement signal is received, the reception terminal determines whether the size of interference received from another link is larger than a threshold in step 1011. Another link in step 1013 includes a link having a priority higher than the link of the reception terminal. That is, the reception terminal calculates the size of the interference received from the other link by using received power of the power measurement signal of its own link and received power of the power measurement signal of the other link. For example, the size of the interference received from the other link may be estimated based on equation (1) above. Further, the reception terminal compares the interference size with the threshold. When the interference size is larger than or equal to the threshold, the reception terminal abandons reception and ends the process.

When the interference size is smaller than the threshold or when the power measurement signal of the link having the higher priority is not received in step 1009, the reception terminal transmits an inverse power signal including sequences according to the sequence pattern corresponding to priority of links through a plurality of sub-blocks in step 1013. More specifically, the reception terminal identifies a priority allocated to its own link and identifies a sequence pattern corresponding to the priority. Further, the reception terminal generates sequences corresponding to the number of sub-blocks and, at this time, applies the sequence pattern. In addition, the transmission terminal transmits the sequences through respective sub-blocks with an RX block of a link scheduling channel.

Thereafter, the reception terminal receives a traffic signal from the transmission terminal in step 1015. The traffic signal follows the modulation scheme and coding rate determined by the transmission terminal based on the channel quality of a whole band.

Figure 11:
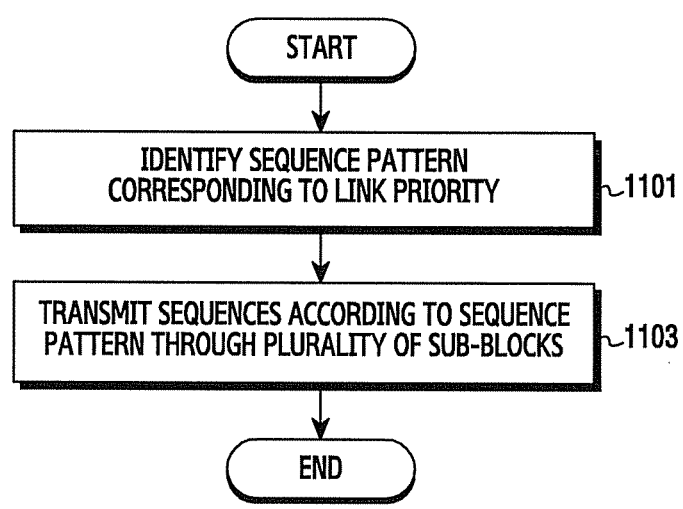
FIG. 11 illustrates a power signal transmission process of a terminal in a wireless communication system according to an embodiment of the present disclosure.

FIG. 11 illustrates a power signal transmission process of the terminal in a wireless communication system according to an embodiment of the present disclosure. The process of FIG. 11 may be applied to the process in which the transmission terminal transmits the power measurement signal and the process in which the reception terminal transmits the inverse power signal.

Referring to FIG. 11, the terminal identifies a sequence pattern corresponding to a priority of its own link in step 1101. The sequence pattern includes a cyclic offset pattern or an index pattern. The sequence pattern and the priority have a corresponding relation therebetween and are predefined. Accordingly, all terminals, which participate in D2D communication, know the corresponding relation between the priority and the sequence pattern. Information on the corresponding relation may be provided in the form of system information before the D2D communication is performed. Alternatively, the information on the corresponding relation may be stored in the terminal when the terminal is manufactured or a program code for the D2D communication is installed.

Subsequently, the terminal generates sequences according to the sequence pattern and transmits the sequences through a plurality of sub-blocks in step 1103. In other words, the terminal generates sequences included in an orthogonal sequence set according to the sequence pattern corresponding to the priority of its own link and transmits one sequence per sub-block. At this time, the terminal generates sequences corresponding to the number of sub-blocks according to the sequence pattern.

Figure 12:
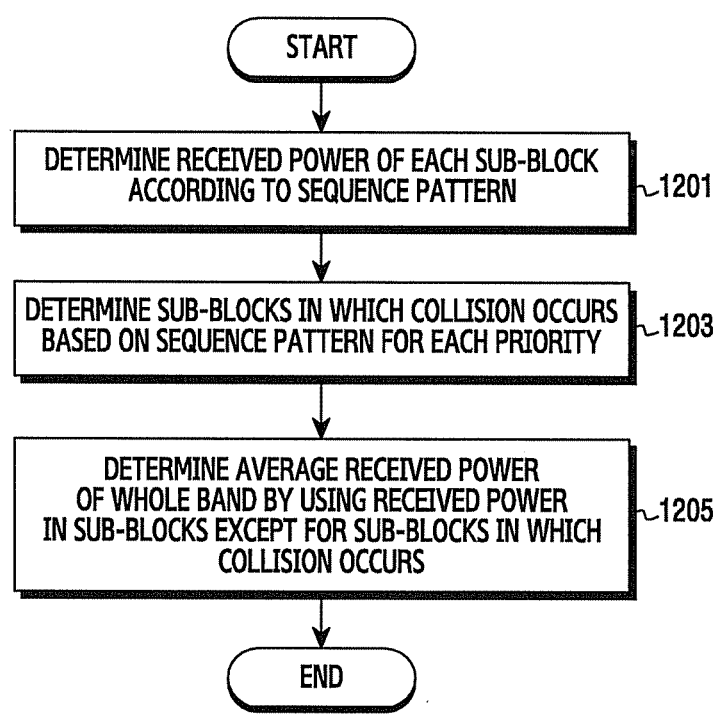
FIG. 12 illustrates a power signal reception process of a terminal in a wireless communication system according to an embodiment of the present disclosure.

FIG. 12 illustrates a power signal reception process of the terminal in a wireless communication system according to an embodiment of the present disclosure. The process of FIG. 12 may be applied to the process in which the transmission terminal receives the inverse power signal and the process in which the reception terminal receives the power measurement signal.

Referring to FIG. 12, the terminal determines received power of each sub-block according to a sequence pattern in step 1201. More specifically, the terminal generates a reference signal according to the sequence pattern corresponding to a priority of its own link. Further, the terminal measures received power of each sub-block by performing an operation of correlation between the reference signal and the received signal. The sequence pattern includes a cyclic offset pattern or an index pattern. The sequence pattern and the priority have a corresponding relation therebetween and are predefined. Accordingly, all terminals, which participate in D2D communication, know the corresponding relation between the priority and the sequence pattern. Information on the corresponding relation may be provided in the form of system information before the D2D communication is performed. Alternatively, the information on the corresponding relation may be stored in the terminal when the terminal is manufactured or a program code for the D2D communication is installed.

Subsequently, the terminal determines a sub-block in which collision occurs, based on the sequence pattern according to each priority in step 1203. As described above, since the terminal knows the corresponding relation between the priority and the sequence pattern, the terminal may determine a sequence pattern of power signals transmitted by other terminals. Accordingly, the terminal may determine at least one sub-block, in which collision with another power signal occurs, based on the sequence pattern to measure current received power by comparing sequence patterns. However, when the number of terminals transmitting the power signals is small, the collision may not occur.

Thereafter, the terminal determines average received power of a whole band by using received power of each of the remaining sub-blocks except for at least one sub-block in which collision occurs in step 1205. That is, the terminal averages the received power of each of the remaining sub-blocks.

Figure 13:
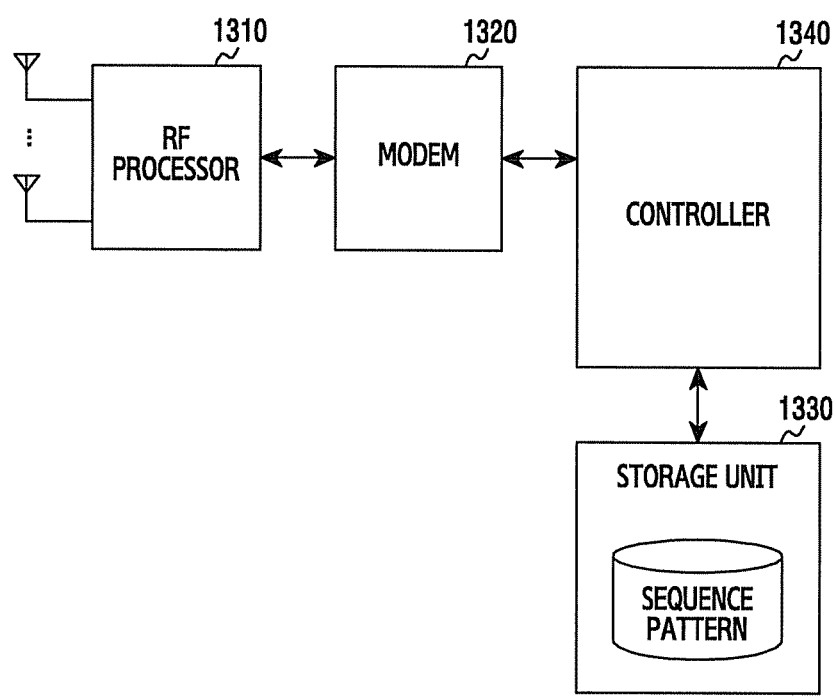
FIG. 13 is a block diagram of a terminal in a wireless communication system according to an embodiment of the present disclosure.

FIG. 13 is a block diagram of the terminal in a wireless communication system according to an embodiment of the present disclosure.

Referring to FIG. 13, the terminal includes an RF (Radio Frequency) processor 1310, a modem 1320, a storage unit 1330, and a controller 1340.

The RF processor 1310 performs a function of transmitting/receiving a signal through a radio channel such as converting or amplifying a signal band. That is, the RF processor 1310 up-converts a baseband signal provided from the modem 1320 into an RF band signal and then transmits the signal through an antenna, and down-converts an RF band signal received through the antenna into a baseband signal. For example, the RF processor 1310 may include an amplifier, a mixer, an oscillator, a DAC (Digital to Analog Convertor), an ADC (Analog to Digital Convertor), and the like. Further, the RF processor 1310 may perform beamforming to assign beam directivity.

The modem 1320 performs a function for a conversion between a baseband signal and a bit string according to a physical layer standard of the system. For example, in an OFDM (Orthogonal Frequency Division Multiplexing) scheme, when transmitting data, the modem 1320 generates complex symbols by encoding and modulating a transmission bit string, mapping the complex symbols to subcarriers, and then configures OFDM symbols through an IFFT (Inverse Fast Fourier Transform) operation and a CP (Cyclic Prefix) insertion. Further, when receiving data, the modem 1320 divides the baseband signal provided from the RF processor 1310 in the unit of OFDM symbols, reconstructs the signal mapped to the subcarriers through an FFT (Fast Fourier Transform) operation, and then reconstructs a reception bit string through demodulation and decoding.

The storage unit 1330 stores a basic program for the operation of the terminal, an application program, and data such as configuration information. Particularly, the storage unit 1330 stores information on the corresponding relation between the priority and the sequence pattern. Information on the corresponding relation may be provided in the form of system information before the D2D communication is performed. Alternatively, the information on the corresponding relation may be stored in the terminal when the terminal is manufactured or a program code for the D2D communication is installed.

The controller 1340 controls the general operation of the terminal. For example, the controller 1340 transmits/receives a signal through the modem 1320 and the RF processor 1310. Further, the controller 1340 records data in the storage data 1330 and reads the recorded data. According to an embodiment of the present disclosure, the controller 1340 controls a process for performing D2D communication. Particularly, the controller 1340 performs functions for measuring channel quality of a whole band in link scheduling. For example, the controller 1340 controls the terminal to perform the process illustrated in FIGS. 9, 10, 11, and 12. The operation of the controller 1340 according to an embodiment of the present disclosure is described below.

When the terminal operates as the transmission terminal, the controller 1340 transmits a power measurement signal including sequences according to a sequence pattern corresponding to priorities of links through a plurality of sub-blocks within a TX block by using the modem 1320 and the RF processor 1310. Thereafter, when a signal is received through an RX block, the controller 1340 measures received power of each sub-block by using sequence patterns corresponding to a priority of its own link. Further, the controller 1340 determines average received power of the whole band according to at least one sequence pattern corresponding to a priority higher than that of its own link. When the average received power of the whole band is determined, received power in at least one sub-block in which collision occurs is excluded from the determination. Thereafter, the controller 1340 determines whether the size of interference to another link is larger than a threshold by using the average received power of the whole band. When the interference size is smaller than the threshold, when an inverse power signal of a link having a higher priority is not received, or when there is no link having a higher priority, the controller 1340 performs transmission rate scheduling and transmits a traffic signal.

When the terminal operates as the reception terminal, the controller 1340 receives a power measurement signal including sequences according to a sequence pattern corresponding to priorities of links through a plurality of sub-blocks within a TX block and determines average received power of the whole band according to sequence patterns corresponding to a priority of its own link. Further, the controller 1340 determines average received power of the whole band according to at least one sequence pattern corresponding to a priority higher than that of its own link. Thereafter, the controller 1340 determines whether the size of interference received from another link is larger than a threshold. When the interference size is smaller than the threshold, when a power measurement signal of a link having a higher priority is not received, or when there is no link having a higher priority, the controller 1340 transmits an inverse power signal including sequences according to a sequence pattern corresponding priorities of links through a plurality sub-blocks. Thereafter, the controller 1340 receives a traffic signal from the transmission terminal.

In the above described operation process, a process of transmitting the power measurement signal or the inverse power signal will be described below in detail. First, the controller 1340 identifies a sequence pattern corresponding to a priority of its own link. The sequence pattern includes a cyclic offset pattern or an index pattern. Further, the controller 1340 generates sequences according to the sequence pattern and transmits the sequences through a plurality of sub-blocks. At this time, the controller 1340 generates sequences corresponding to the number of sub-blocks according to the sequence pattern and transmits one sequence per sub-block.

In the above described operation process, a process of receiving the power measurement signal or the inverse power signal will be described below in detail. The controller 1340 generates a reference signal according to the sequence pattern corresponding to the priority of its own link. Further, the controller 1340 measures received power of each sub-block by performing an operation of correlation between the reference signal and the received signal. The sequence pattern includes a cyclic offset pattern or an index pattern. Subsequently, the controller 1340 determines sub-blocks in which collision occurs based on the sequence pattern according to each priority, and determines average received power of a whole band by using received power of each of the remaining sub-blocks except for one or more sub-blocks in which the collision occurs. That is, the controller 1340 averages the received power of each of the remaining sub-blocks.

Hereinafter, a result of a simulation for comparing the conventional single tone-based link scheduling and the link scheduling proposed by the present disclosure will be described. The link scheduling comparison may be performed from a viewpoint of a scheduling error rate and a total transmission rate. It is assumed that the simulation for proving an effect of the present disclosure is conducted under an environment shown in Table 1.

TABLE 1

| Parameter | Value |
| --- | --- |
| Number of links | Fewer than 100/150/200 |
| Type of distribution of terminals | Uniform distribution |
| Cell environment | 1 km × 1 km square area |
| System bandwidth | 2.5/5/10 MHz |
| FFT size | 256/512/1024 |
| CP size | 64/128/256 |
| Sub-block size (NT × NFsub) | 4 × 15 |
| Number of sub-blocks of each bandwidth (2.5/5/10 MHz) | 10/20/40 |
| Pathloss model | ITU-1411 LOS (lower bound) |
| Maximum inter-link distance | 100/200/500 |
| Yielding threshold | 9 dB |
| Transmitted power of transmission terminal | 20 dBm |
| Noise power | −174 dBm |
| Noise figure | 7 dB |
| Multi-path channel model | ITU Pedestrian A |

The size of a time domain of the sub-block, which is considered when the structure proposed by the present disclosure is applied, is defined by four OFDM symbols equally to the conventional structure. Further, the size of a frequency domain is defined by fifteen subcarriers in the structure to which the CAZAC sequence is applied, and by sixteen subcarriers in the structure to which the Walsh code is applied, through a simulation considering a frequency selective characteristic of an ITU pedestrian A model corresponding to a multi-path channel model.

Meanwhile, in the simulation, transmitted power per subcarrier is the same as transmitted power in an actual data segment channel in the conventional single tone-based link scheduling structure and the structure according to the present disclosure. In this case, the structure according to the present disclosure has more power consumption due to actual transmission compared to the conventional structure since the structure according to the present disclosure uses a larger number of subcarriers. However, a signal arrival distance is the same in both structures and the structure according to the present disclosure is robust against noise because of a characteristic of performing a correlation operation for a plurality of subcarriers, compared to the conventional structure.

FIGS. 14 to 17 illustrate a performance comparison between the present disclosure and the prior art.

Figure 14A:
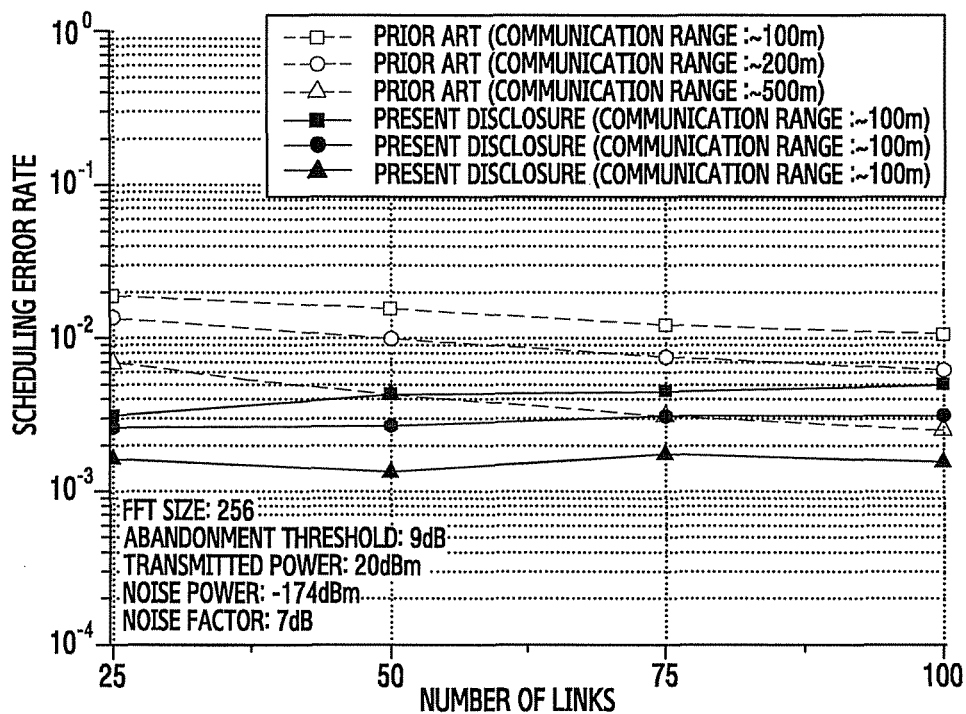
FIGS. 14 to 17 illustrate a performance comparison between the present disclosure and the prior art.
Figure 14B:
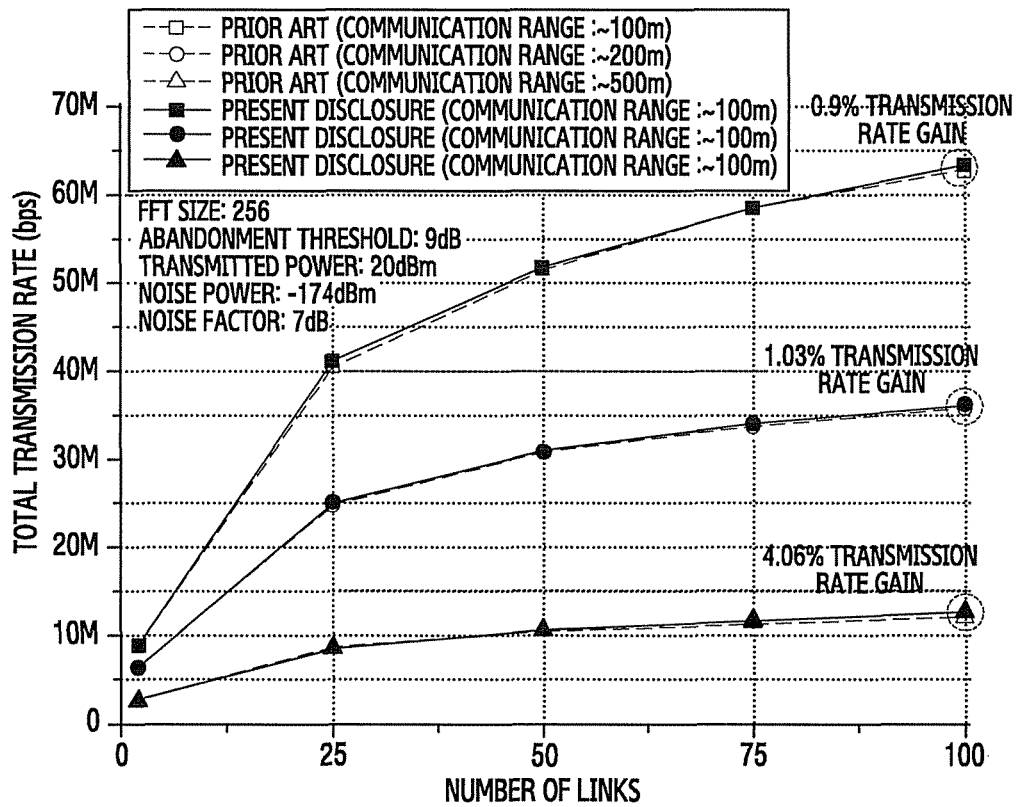
Figure 15A:
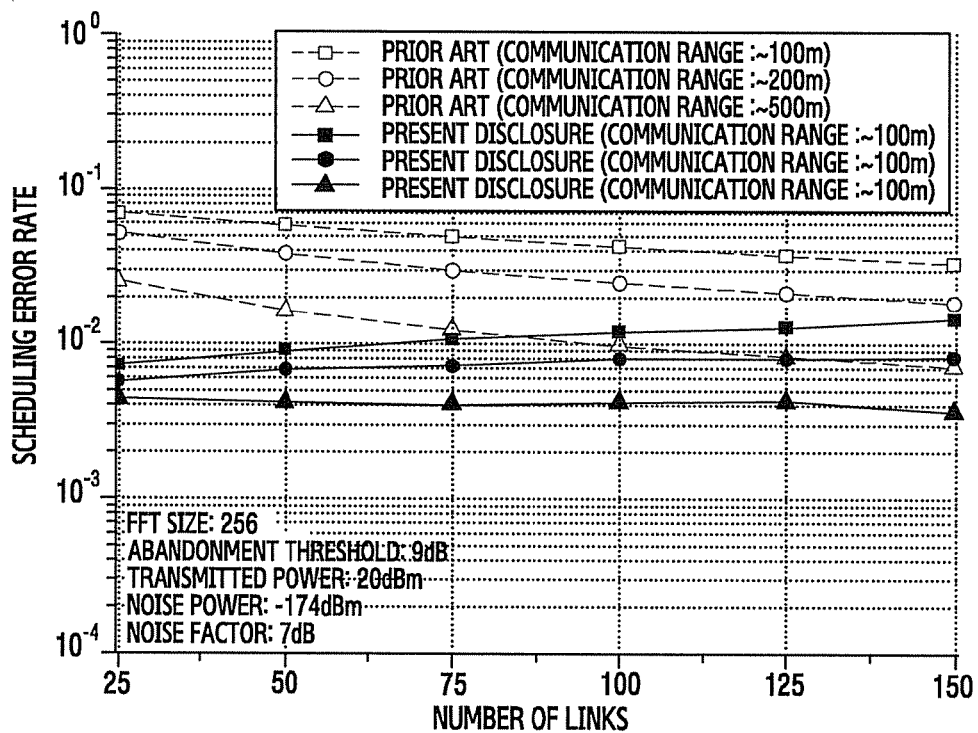
Figure 15B:
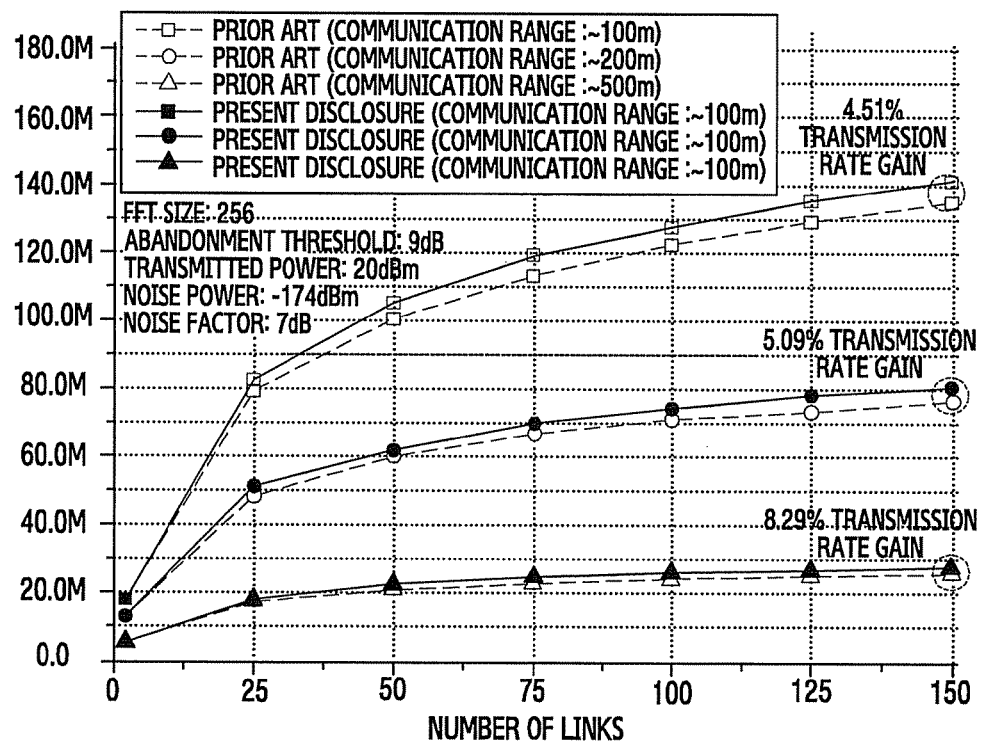
Figure 16A:
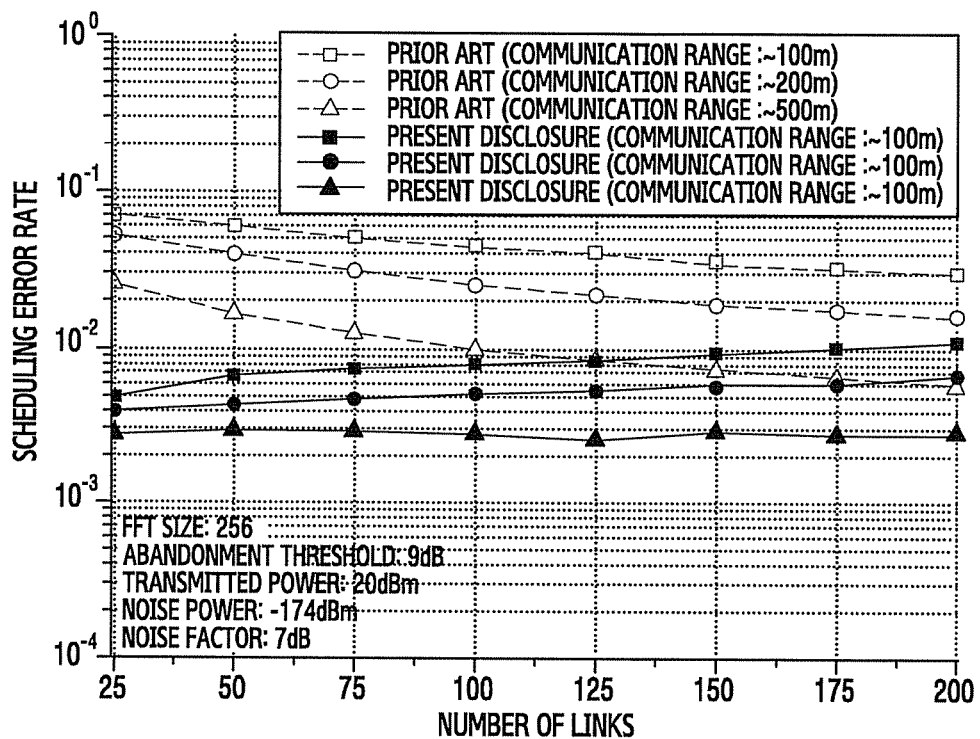
Figure 16B:
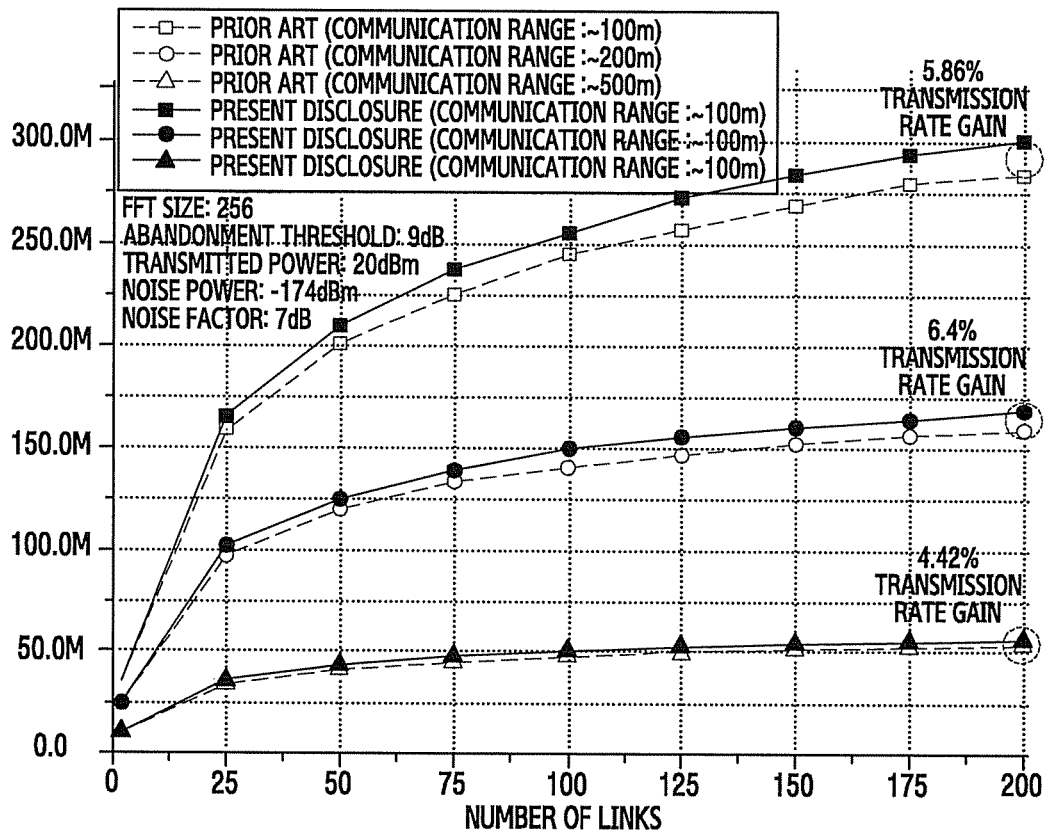

In FIGS. 14 to 16, a scheduling error performance and a transmission rate are compared according to various system parameters and communication distances. The FFT size is 256 in FIG. 14, the FFT size is 512 in FIG. 15, and the FFT size is 1024 in FIG. 16.

In spite of performance differences depending on a communication distance, the present disclosure has a gain in both the scheduling error performance and the transmission rate compared to the single tone-based prior art since the link scheduling is performed based on channel quality measurement values of a whole band in the present disclosure. More specifically, in light of an average performance of each environment, the present disclosure has a gain of about 4.5% compared to the prior art.

It is noted that, through the simulation result, the present disclosure can perform more accurate link scheduling even in a frequency selective fading channel environment compared to the conventional single tone transmission-based D2D link scheduling technology. Further, the performance of the accurate link scheduling can reduce scheduling errors generated due to the margin of error of channel quality estimation and, accordingly, the fairness and transmission rate can be improved.

Figure 17A:
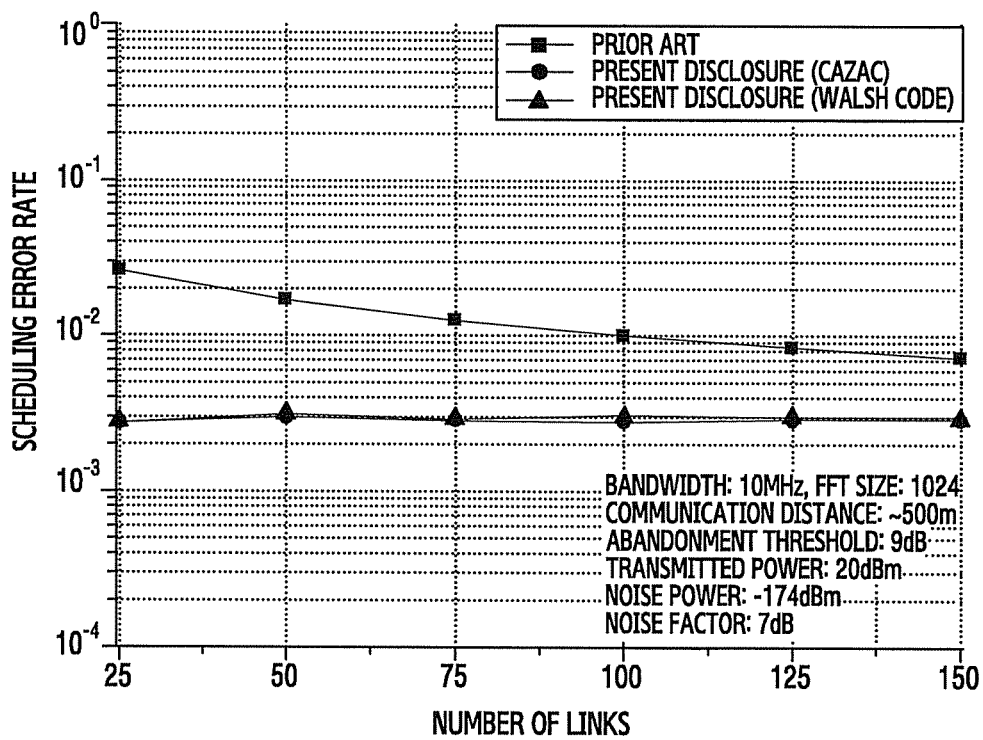
Figure 17B:
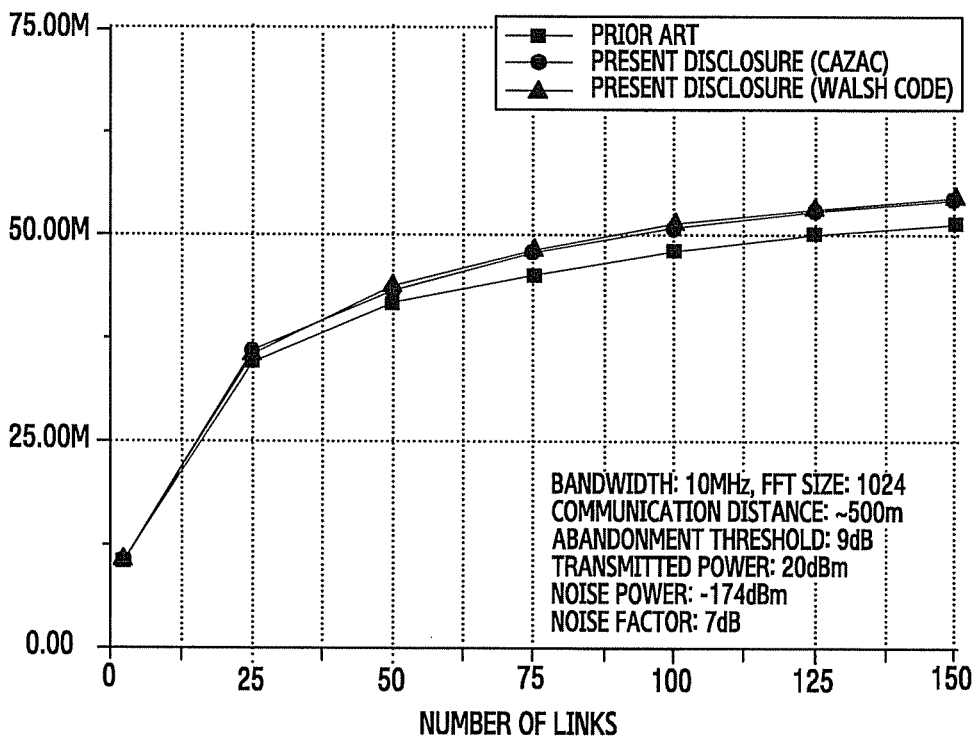

In FIG. 17, a scheduling error performance and a transmission rate among the conventional single tone structure, the proposed structure to which the CAZAC sequence is applied, and the proposed structure to which the Walsh code is applied in a 10 MHz bandwidth environment are compared. When the present disclosure is implemented using the Walsh code, the size of the sub-block should be determined to be a power of two. Accordingly, in the simulation, the sub-block size is determined as 64 (four OFDM symbols× sixteen subcarriers). This is similar to the sub-block size of 60 (four OFDM symbols×fifteen subcarriers) when the CAZAC sequence is applied. Referring to FIG. 17, a time/frequency selective characteristic of the channel within the sub-block is almost the same regardless of the type of sequences. As a result, there is little difference between performances of the scheduling error performance and the transmission rate.

Meanwhile, when the CAZAC sequence is used for measuring received channel power per sub-block, the correlation operation using a complex reference signal is required, so that the number of links and the number of sub-blocks increase and thus operation complexity significantly increases. When the Walsh code is used, the correlation operation is performed only by complex adding and subtracting operations of reception subcarriers due to a characteristic that the Walsh code includes only 1 or −1, so that relatively low complexity implementation is possible.

Methods, according to various embodiments, disclosed in claims and/or the specification may be implemented in the form of hardware, software, or a combination thereof.

In the implementation of software, a computer-readable storage medium for storing one or more programs (software modules) may be provided. The one or more programs stored in the computer-readable storage medium may be configured for execution by one or more processors within the electronic device. The one or more programs may include instructions for allowing the electronic device to carry out the methods, according to the various embodiments, disclosed in the claims and/or the specification.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method for operating a terminal in a wireless communication system supporting device to device (D2D) communication, the method comprising:
generating a plurality of sequences based on a sequence pattern corresponding to a priority of a link between the terminal and another terminal, the sequence pattern comprising different offset values; and
transmitting a signal comprising each of the plurality of sequences being transmitted through each of a plurality of sub-blocks of a channel,
wherein each of the plurality of sequences is generated by applying each of the different offset values of the sequence pattern to a single sequence, and
wherein the plurality of sequences are used, by the another terminal, to measure a received power for the channel.

2. The apparatus of claim 1, wherein a transmission power of the plurality of sequences is equal to transmission power of a traffic signal being transmitted for the D2D communication.

3. The method of claim 1, wherein transmission power of the plurality of sequences is a product of a reciprocal of received power of the signal received from the another terminal and a predefined constant.

4. The method of claim 1, wherein the channel is a link scheduling channel for transmitting a signal for received power measurement, which is the basis of determination on whether to perform the D2D communication.

5. The method of claim 1, wherein the sequence pattern is defined as one of a sequence cyclic offset pattern or a sequence index pattern, and
wherein a first sequence and a second sequence of the plurality of sequences are orthogonal each other if an offset value for the first sequence is different from an offset value for the second sequence.

6. A method for operating a terminal in a wireless communication system supporting device to device (D2D) communication, the operation method comprising:
generating a first plurality of sequences based on a sequence pattern corresponding to a priority of a link between the terminal and another terminal, the sequence pattern comprising different offset values;
receiving, from the another terminal, a signal comprising each of a second plurality of sequences being transmitted through each of a plurality of sub-blocks of a channel;
determining a received power for each of the plurality of sub-blocks based on the first plurality of sequences,
wherein the second plurality of sequences is based on the sequence pattern corresponding to the priority of the link between the terminal and the another terminal, and
wherein each of the first plurality of sequences is generated by applying each of the different offset values of the sequence pattern to a single sequence.

7. The method of claim 6, further comprising:
identifying at least one sub-block among the plurality of sub-blocks, in which sequence collision occurs, by using at least one sequence pattern corresponding to at least one priority for one or more other links; and
estimating a channel quality by performing a correlation operation between the first plurality of sequences and remaining sub-blocks except for the identified at least one sub-block among the plurality of sub-blocks.

8. The apparatus of claim 6, wherein a transmission power of the first plurality of sequences is equal to transmission power of a traffic signal being transmitted for the D2D communication.

9. The method of claim 6, wherein transmission power of the first plurality of sequences is a product of a reciprocal of received power of the signal received from the another terminal and a predefined constant.

10. The method of claim 6, wherein the channel is a link scheduling channel for transmitting the signal for received power measurement, which is the basis of determination on whether to perform the D2D communication.

11. The method of claim 6, wherein the sequence pattern is defined as one of a sequence cyclic offset pattern or a sequence index pattern, and
wherein a first sequence and a second sequence of the plurality of sequences are orthogonal each other if an offset value for the first sequence is different from an offset value for the second sequence.

12. The method of claim 6, wherein transmitted power of the sequences is a product of a reciprocal of received power of the signal from the another terminal and a predefined constant.

13. An apparatus for a terminal in a wireless communication system supporting device to device (D2D) communication, the apparatus comprising:
a transceiver; and
at least one processor, operatively connected to the transceiver, configured to:
generate a plurality of sequences based on a sequence pattern corresponding to a priority of a link between the terminal and another terminal, the sequence pattern comprising different offset values, and
transmit a signal comprising each of the plurality of sequences being transmitted through each of a plurality of sub-blocks of a channel,
wherein each of the plurality of sequences is generated by applying each of the different offset values of the sequence pattern to a single sequence, and
wherein the plurality of sequences are used, by the another terminal, to measure a received power for the channel.

14. The apparatus of claim 13, wherein a transmission power of the plurality of sequences is equal to transmission power of a traffic signal being transmitted for the D2D communication.

15. The apparatus of claim 13, wherein transmitted power of the sequences is a product of a reciprocal of received power of the signal received from the another terminal and a predefined constant.

16. The apparatus of claim 13, wherein the channel is a link scheduling channel for transmitting a signal for received power measurement, which is the basis of determination on whether to perform the D2D communication.

17. The apparatus of claim 13, wherein the sequence pattern is defined as one of a sequence cyclic offset pattern or a sequence index pattern, and
wherein a first sequence and a second sequence of the plurality of sequences are orthogonal each other if an offset value for the first sequence is different from an offset value for the second sequence.

18. An apparatus for a terminal in a wireless communication system supporting device to device (D2D) communication, the apparatus comprising:
a transceiver; and
at least one processor, operatively connected to the transceiver, configured to:
generate a first plurality of sequences based on a sequence pattern corresponding to a priority of a link between the terminal and another terminal, the sequence pattern comprising different offset values,
receive, from the another terminal, a signal comprising each of a second plurality of sequences being transmitted through each of a plurality of sub-blocks of a channel, and
determine a received power for each of the plurality of sub-blocks based on the first plurality of sequences,
wherein the second plurality of sequences is based on the sequence pattern corresponding to the priority of the link between the terminal and the another terminal, and
wherein each of the first plurality of sequences is generated by applying each of the different offset values of the sequence pattern to a single sequence.

19. The apparatus of claim 18, wherein the at least one processor is further configured to:
identify at least one sub-block among the plurality of sub-blocks, in which sequence collision occurs, by using at least one sequence pattern corresponding to at least one priority for one or more other links; and
estimate a channel quality by performing a correlation operation between the first plurality of sequences and remaining sub-blocks except for the identified at least one sub-block among the plurality of sub-blocks.

20. The apparatus of claim 18, wherein a transmission power of the second plurality of sequences is equal to transmission power of a traffic signal being transmitted for the D2D communication.

21. The method of claim 18, wherein transmission power of the first plurality of sequences is a product of a reciprocal of received power of the signal from the another terminal and a predefined constant.

22. The apparatus of claim 18, wherein the channel is a link scheduling channel for transmitting a signal for received power measurement, which is the basis of determination on whether to perform the D2D communication.

23. The apparatus of claim 18, wherein the sequence pattern is defined as one of a sequence cyclic offset pattern or a sequence index pattern, and
wherein a first sequence and a second sequence of the plurality of sequences are orthogonal each other if an offset value for the first sequence is different from an offset value for the second sequence.

* * * * *